US009852511B2

(12) United States Patent
Gao et al.

(10) Patent No.: US 9,852,511 B2
(45) Date of Patent: Dec. 26, 2017

(54) SYSTEMS AND METHODS FOR TRACKING AND DETECTING A TARGET OBJECT

(71) Applicant: QUALCOMM Incorporated, San Diego, CA (US)

(72) Inventors: Dashan Gao, San Diego, CA (US); Xin Zhong, San Diego, CA (US); Yingyong Qi, San Diego, CA (US); Ning Bi, San Diego, CA (US)

(73) Assignee: QUALCOMM Incoporated, San Diego, CA (US)

( * ) Notice: Subject to any disclaimer, the term of this patent is extended or adjusted under 35 U.S.C. 154(b) by 296 days.

(21) Appl. No.: 13/951,731

(22) Filed: Jul. 26, 2013

(65) Prior Publication Data

US 2014/0205141 A1 Jul. 24, 2014

Related U.S. Application Data

(60) Provisional application No. 61/755,443, filed on Jan. 22, 2013, provisional application No. 61/835,385, filed on Jun. 14, 2013, provisional application No. 61/835,391, filed on Jun. 14, 2013.

(51) Int. Cl.
*G06T 7/20* (2017.01)

(52) U.S. Cl.
CPC ...... *G06T 7/20* (2013.01); *G06T 2207/10016* (2013.01); *G06T 2207/20021* (2013.01); *G06T 2207/20104* (2013.01); *G06T 2207/30241* (2013.01)

(58) Field of Classification Search
CPC ............ G06T 7/20; G06T 2207/10016; G06T 2207/20021; G06T 2207/20104; G06T 2207/30241
See application file for complete search history.

(56) References Cited

U.S. PATENT DOCUMENTS

| 5,594,469 A * | 1/1997 | Freeman ............ G05B 19/106 345/157 |
| 2003/0053661 A1 | 3/2003 | Magarey |
| 2005/0196015 A1* | 9/2005 | Luo .................... G06K 9/00234 382/103 |
| 2008/0186386 A1 | 8/2008 | Okada et al. |

(Continued)

FOREIGN PATENT DOCUMENTS

| CN | 101163280 A | 4/2008 |
| CN | 101551910 B | 5/2012 |

(Continued)

OTHER PUBLICATIONS

Fayad et al. "Object-level fusion and confidence management in a multi-sensor pedestrian tracking system." Multisensor Fusion and Integration for Intelligent Systems. Springer Berlin Heidelberg, 2009. 15-31.*

(Continued)

*Primary Examiner* — Katrina Fujita

(57) ABSTRACT

A method for detecting and tracking a target object is described. The method includes performing motion-based tracking for a current video frame by comparing a previous video frame and the current video frame. The method also includes selectively performing object detection in the current video frame based on a tracked parameter.

60 Claims, 12 Drawing Sheets

(56) References Cited

U.S. PATENT DOCUMENTS

| | | | |
|---|---|---|---|
| 2008/0240497 A1* | 10/2008 | Porikli | G06T 7/20 382/103 |
| 2009/0252374 A1* | 10/2009 | Ishikawa et al. | 382/103 |
| 2010/0034464 A1* | 2/2010 | Ito | G06K 9/6231 382/190 |
| 2010/0272363 A1* | 10/2010 | Steinberg | G06K 9/00228 382/190 |
| 2012/0243737 A1 | 9/2012 | Ogawa | |
| 2012/0314907 A1 | 12/2012 | Casamona et al. | |
| 2013/0050502 A1 | 2/2013 | Saito et al. | |
| 2013/0136303 A1* | 5/2013 | Tsukamoto | G06K 9/00577 382/103 |

FOREIGN PATENT DOCUMENTS

| | | |
|---|---|---|
| EP | 2107524 A2 | 10/2009 |
| WO | WO-2011161307 A1 | 12/2011 |
| WO | WO-2013021275 A1 | 2/2013 |

OTHER PUBLICATIONS

International Search Report and Written Opinion—PCT/US2014/011724—ISA/EPO—Apr. 25, 2014.

Liu W., et al., "Rear Vehicle Detection and Tracking for Lane Change Assist", Intelligent Vehicles Symposium, 2007 IEEE, IEEE, PI, Jun. 1, 2007 (Jun. 1, 2007), pp. 252-257, XP031126953, ISBN: 978-1-4244-1067-5, abstract p. 252, right-hand column, last paragraph p. 254, right-hand column, line 40—p. 255, right-hand column, line 31.

Yilmaz A., et al., "Object tracking", ACM Computing Surveys, vol. 38, No. 4, Dec. 25, 2006 (Dec. 25, 2006), pp. 1-45, XP055053833, ISSN: 0360-0300, DOI:10.1145/1177352.1177355, the whole document.

Kalal Z., et al., "Forward-Backward Error: Automatic Detection of Tracking Failures," International Conference on Pattern Recognition 2010, Aug. 23-26, 2010, Istanbul, Turkey, pp. 2756-2759, XP31771139.

* cited by examiner

SYSTEMS AND METHODS FOR TRACKING AND DETECTING A TARGET OBJECT

RELATED APPLICATIONS

This application is related to and claims priority from U.S. Provisional Patent Application Ser. No. 61/755,443, filed Jan. 22, 2013, for "TRACKING AND DETECTING A TARGET OBJECT" and U.S. Provisional Patent Application Ser. No. 61/835,385, filed Jun. 14, 2013, for "SMOOTHING JITTER IN MOTION TRACKING RESULTS" and U.S. Provisional Patent Application Ser. No. 61/835,391, filed Jun. 14, 2013, for "ZOOM CONTROL DURING MOTION TRACKING," which are all incorporated herein by reference.

TECHNICAL FIELD

The present disclosure relates generally to electronic devices. More specifically, the present disclosure relates to systems and methods for tracking and detecting a target object.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or with higher quality are often sought after.

Some electronic devices (e.g., cameras, video camcorders, digital cameras, cellular phones, smart phones, computers, televisions, etc.) capture or utilize images. For example, a digital camera may capture a digital image.

New and/or improved features of electronic devices are often sought for. As can be observed from this discussion, systems and methods that add new and/or improved features of electronic devices may be beneficial.

SUMMARY

Figure 1:
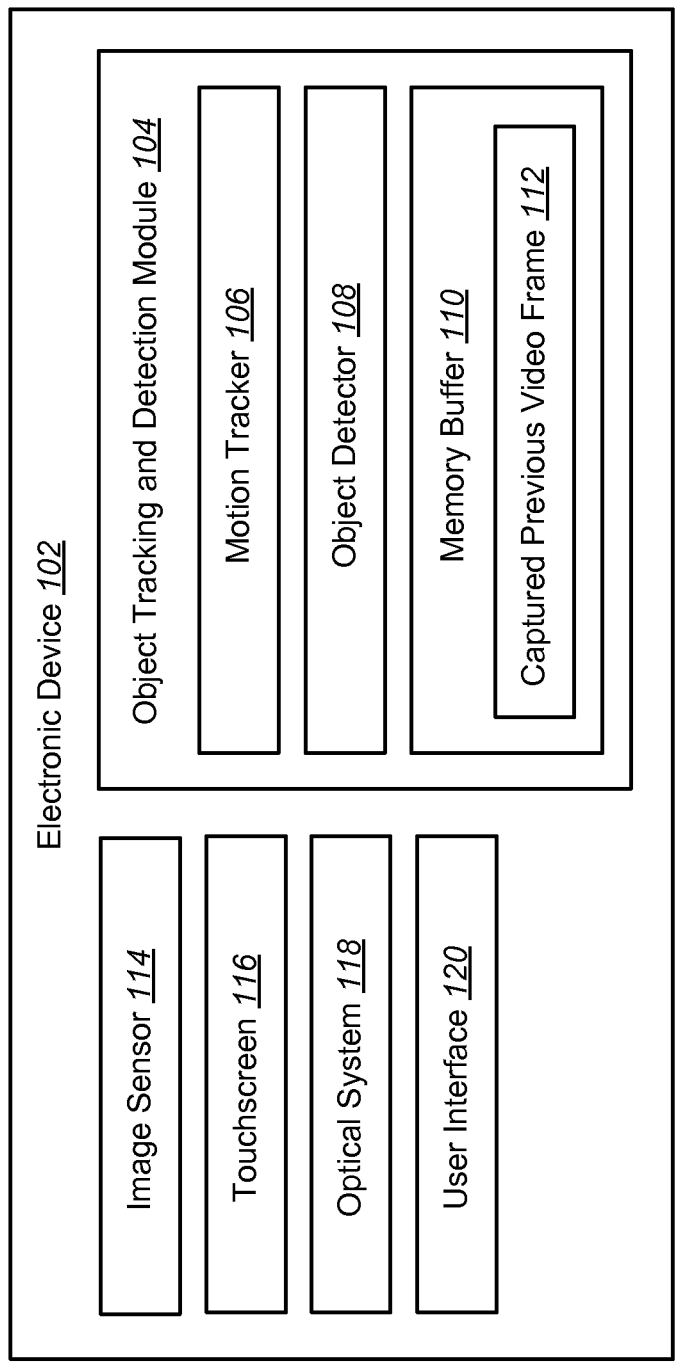
FIG. 1 is a block diagram illustrating an electronic device for tracking and detecting a target object.

A method for detecting and tracking a target object is described. The method includes performing motion-based tracking for a current video frame by comparing a previous video frame and the current video frame. The method also includes selectively performing object detection in the current video frame based on a tracked parameter.

The tracked parameter may be a tracking confidence value that corresponds to a likelihood that the target object is in the current video frame. Selectively performing object detection may include performing object detection on the current video frame when the tracking confidence value is less than or equal to a tracking threshold. Selectively performing object detection may also include skipping object detection on the current video frame when the tracking confidence value is greater than a tracking threshold. The object detection may be performed sequential to the motion-based tracking. The tracked parameter may also be a region. The tracked parameter may also be a window location. The tracked parameter may also be a window size. The tracked parameter may also be a scale level. The method may also include receiving input at a touchscreen defining the target object.

Selectively performing object detection may include selecting a first subset of windows in the previous video frame. Selectively performing object detection may also include searching only the first subset of windows for the target object. Selectively performing object detection may also include selecting, for each selected window in the first subset of windows, a subset of window sizes. Selectively performing object detection may also include searching only the subset of window sizes for each window in the first subset of windows. Selecting the first subset of windows may include selecting the first subset of windows randomly based on a random number generator.

The method may further include selecting a second subset of windows in the current video frame. A size of the second subset of windows may be based on whether the target object was detected in the previous video frame. An increase in the size from the first subset of windows to the second subset of windows may be higher if the target object was detected in the previous video frame than if the target object was not detected in the previous video frame.

The method may also include increasing a percentage of windows selected in subsequent frames. An increase in the percentage of windows selected may be uniform or non-uniform. A percentage of windows selected may be at least 60% when a detection and tracking confidence value is above a detection and tracking confidence threshold. The detection and tracking confidence threshold may be one of 0.6, 0.65, 0.7, 0.75, 0.8 and 0.85.

The method may also include narrowing a search range for an attempt to detect the target object in a next video frame based on a detection and tracking confidence value. Narrowing a search range may also include selecting window locations for search from a reduced search space when the detection and tracking confidence value for the current video frame is greater than a detection and tracking threshold. The detection and tracking confidence value for the current video frame may be a real number between 0 and 1 indicating a likelihood that the target object was detected and tracked in the current video frame. Narrowing a search range may also include selecting window locations for search from an entire search space when a detection and tracking confidence value for the current video frame is less than or equal to a detection and tracking threshold.

An apparatus for detecting and tracking a target object is also described. The apparatus includes means for performing motion-based tracking for a current video frame by comparing a previous video frame and the current video frame. The apparatus also includes means for selectively performing object detection in the current video frame based on a tracked parameter.

An electronic device for detecting and tracking a target object is also described. The electronic device includes a processor and memory in electronic communication with the processor. The electronic device also includes instructions stored in memory. The instructions are executable to perform motion-based tracking for a current video frame by comparing a previous video frame and the current video frame. The instructions are also executable to selectively perform object detection in the current video frame based on a tracked parameter.

A computer-program product for detecting and tracking a target object is also described. The computer-program product includes a non-transitory computer-readable medium having instructions thereon. The instructions include code for causing an electronic device to perform motion-based tracking for a current video frame by comparing a previous video frame and the current video frame. The instructions also include code for causing the electronic device to selectively perform object detection in the current video frame based on a tracked parameter.

DETAILED DESCRIPTION

Tracking an object within an image or a user defined region of interest within that image using a camera from a mobile platform (e.g., tablets, phones) may be difficult. Real-time performance (~30 frames per second (fps)) may be required. Some configurations may combine the output of an optical flow-based tracker and an image content-based detector to obtain robust tracking. However, the computation of the existing algorithms may be prohibitive for mobile platforms to achieve real-time performance.

The present systems and methods may implement the following techniques to improve the speed of the tracking and detection algorithms: (1) using a fraction of possible detection windows at each frame, (e.g. randomly select the window positions); (2) selecting only a few spatial scales for object detection that are close to previous detected target size; (3) based on the confidence value of previous tracking, determining either to search the object in partial or the entire image; (4) dynamically adjusting the number of the detection windows based on previous tracking results; (5) instead of running the tracker and object detector in parallel, applying the tracker first, since it is less computationally expensive; and (6) running an object detector only when the confidence of the tracker is lower than a certain threshold. One of the technical advantages is to reduce computations used to track and/or detect a target object.

As used herein, the term "track" and its variants refers to a process that is motion-based, not identifying a specific object. For example, an object tracking and detection module may track motion from frame to frame and determine a location, size or frame of the target object based on movement of an electronic device (e.g., if the camera is panning) or movements of objects from frame to frame. The term "detect" and its variants refers to a process that attempts to identify a target object, e.g., by comparing a portion of a frame to a reference image. For example, an object tracking and detection module may compare portions of captured frames to a reference image (of the target object) in an attempt to identify a target object. In one example, detection may be used when a target can no longer be tracked (e.g., if an object falls outside the field of view). Systems and methods of performing motion-based tracking and object detection are explained in greater detail below.

FIG. 1 is a block diagram illustrating an electronic device 102 for tracking and detecting a target object. The electronic device 102 may also be referred to as a wireless communication device, a mobile device, mobile station, subscriber station, client, client station, user equipment (UE), remote station, access terminal, mobile terminal, terminal, user terminal, subscriber unit, etc. Examples of electronic devices include laptop or desktop computers, cellular phones, smart phones, wireless modems, ereaders, tablet devices, gaming systems, etc. Some of these devices may operate in accordance with one or more industry standards.

An electronic device 102, such as a smartphone or tablet computer, may include a camera. The camera may include an image sensor 114 and an optical system 118 (e.g., lenses) that focuses images of objects that are located within the field of view of the optical system 118 onto the image sensor 114. An electronic device 102 may also include a camera software application and a display screen. When the camera application is running, images of objects that are located within the field of view of the optical system 118 may be recorded by the image sensor 114. The images that are being recorded by the image sensor 114 may be displayed on the display screen. These images may be displayed in rapid succession at a relatively high frame rate so that, at any given moment in time, the objects that are located within the field of view of the optical system 118 are displayed on the display screen. Although the present systems and methods are described in terms of captured video frames, the techniques discussed herein may be used on any digital image. Therefore, the terms video frame and digital image may be used interchangeably herein.

A user interface 120 of the camera application may permit one or more objects that are being displayed on the display screen to be tracked. The user of the electronic device may be permitted to select the object(s) that is/are to be tracked. Further, the selected object(s) may be used as a reference for later detecting the object.

In one configuration, the display is a touchscreen 116 that receives input from physical touch, e.g., by a finger, stylus or other tool. The touchscreen 116 may receive touch input defining a target object to be tracked. For example, if the electronic device 102 is capturing a nature scene that includes an animal of interest, a user may draw a bounding box around the animal indicating a desire that the animal be tracked, or detected, if necessary. Target objects may be selected in any suitable way. For example, facial recognition, pedestrian recognition, etc., may be used to select a target object that is to be tracked, detected, or both. In one configuration, multiple objects may be tracked. A user interface 120 may allow a user to interact with an object tracking and detection module 104, e.g., to select (i.e., define) one or more target objects.

The electronic device 102 may include an object tracking and detection module 104 for tracking a selected object and/or detecting the object in a video frame. The object tracking and detection module 104 may include a motion tracker 106 for tracking one or more objects. The motion tracker 106 may be motion-based for tracking motion of points on an image (e.g., a video frame) from frame to frame to estimate the location and/or change of location of a target object between a previous video frame and a current video frame.

The object tracking and detection module 104 may also include an object detector 108 for detecting an object on a video frame. The object detector 108 may use an object model, rather than a motion-based model, to detect an object by comparing all or a portion of a current video frame to a selected object or portion of a captured previous video frame 112 (e.g., in a sequence of video frames). The object detector 108 may be used for detecting multiple objects within a video frame.

The object tracking and detection module 104 may also include a memory buffer 110. The memory buffer 110 may store one or more captured frames and data associated with the captured video frames. In one example, the memory buffer 110 may store a previous captured video frame 112. The object tracking and detection module 104 may use data provided from the memory buffer 110 about a captured previous video frame 112 in performing motion-based tracking and/or object detection. Data may be provided to the motion tracker 106 or object detector 108 via feedback from the memory buffer 110 in order to tailor motion-based tracking and object detection to more accurately track and/or detect a target object. For example, the memory buffer 110 may provide location and window size data to the motion tracker 106 and the object detector 108 to provide the motion tracker 106 and object detector 108 one or more parameters that may be used to more accurately pinpoint a location and size of an object when tracking or detecting the object.

As stated above, the electronic device 102 may perform motion-based tracking. Motion-based tracking may be performed using a variety of methods. In one example, tracking is performed by a median flow method in which the motion tracker accepts a pair of images $I_t$, $I_{t+1}$ (e.g., video frames) and a bounding box $\beta_t$ and outputs a bounding box $\beta_{t+1}$. A set of points may be initialized on a rectangular grid within the bounding box $\beta_t$ and tracks the points to generate a sparse motion flow between $I_t$ and $I_{t+1}$. A quality of the point prediction may be estimated and each point assigned an error. A portion (e.g., 50%) of the worst predictions may be filtered out while the remaining predictions are used to estimate the displacement of the whole bounding box. The motion tracker 106 may perform motion-based tracking on each video frame captured by an electronic device 102. In a similar method, motion-based tracking may be performed by calculating one or more gradients (e.g., x and y gradients) and using the difference between a pair of frames to calculate a time gradient and using the multiple gradient values to accurately track a target object within a current video frame. Further details regarding motion-based tracking are provided below.

When performing motion-based tracking, the motion tracker 106 may determine a tracking confidence value based on a calculated or estimated accuracy of the motion-tracking method. In some configurations, the tracking confidence value may be a real number between 0 and 1 corresponding to a likelihood or probability that a target object falls within a current video frame or a defined window of the video frame. The tracking confidence value may be compared to a tracking threshold. If the tracking confidence value is greater than the tracking threshold, the likelihood may be high that the target object is found within the current video frame. Alternatively, if the tracking confidence value is less than or equal to a tracking threshold, the likelihood may be low or uncertain whether the target object is found within the current video frame. Various methods for determining a tracking confidence value may be used. In one configuration, the tracking confidence value is determined by calculating a normalized cross correlation (NCC) between a tracked window (e.g., a tracking patch window) in a current video frame and previously stored image patches from previously captured video frames. Further details regarding determining a tracking confidence value are provided below.

The electronic device 102 may also perform object detection. Object detection may be performed using a variety of methods. In one configuration, object detection is performed using a sliding window method in which the content of multiple subsets of windows within a video frame are viewed to determine whether a target object is found in a current video frame or within a particular window or subset of windows of the current video frame. All or a subset of all possible window locations and sizes may be searched in a video frame. For example, each window may correspond to pixels of data and the object detector 108 may perform one or more computations using the pixels of data to determine a level of confidence (e.g., a binary indicator) that the target object is within a particular window or subwindow. Based on the level of confidence associated with one or more windows, a detector confidence value may be obtained for a current video frame. Further, additional techniques may be used for increasing the accuracy or efficiency of the object detection. Some of these techniques are explained below.

In some configurations, the motion tracker 106 and object detector 108 may operate sequentially rather than in parallel. For example, the electronic device 102 may perform motion-based tracking of a selected object (e.g., target object) and sequentially perform object detection of the selected object based on a tracked parameter. In one configuration, the electronic device 102 may perform motion-based tracking on a current video frame. The electronic device 102 may then perform object detection on the current frame based on a tracked parameter. In one configuration, the tracked parameter may be based on a comparison between a confidence value and a threshold. For example, if a tracking confidence value is below a tracking threshold, the electronic device 102 may perform object detection. Alternatively, if a tracking confidence value is above a tracking threshold, the electronic device 102 may skip object detection for a current video frame and continue performing motion-based tracking on a next video frame based on the motion tracking results of the current video frame. In other words, object detection may be performed only when the motion-based tracking is not very good, e.g., tracking confidence value is below a tracking threshold. Other tracked parameters may be used when considering whether and/or how object detection is performed. Examples of tracked parameters may include a region of a target object, a window location, a window size, a scale level, a target size, a tracking and/or detection confidence value or other parameter that may be used to facilitate efficient tracking and/or detection of a target object.

Sequentially performing motion-based tracking and object detection based on a tracked parameter may enable the electronic device 102 to track and/or detect a target object within a video frame without performing extensive computations. Specifically, because motion-based tracking may be less computationally intensive than object detection, an electronic device 102 may skip performing object detection where motion-based tracking may be used to accurately track a target object within a current video frame. For example, if an electronic device 102 determines that a tracking confidence value exceeds a specific target threshold, the electronic device 102 may determine that object detection is not needed on a current video frame to accurately determine the location or presence of a target object within the current video frame. Further, because object detection may be beneficial in many cases, the electronic device 102 may determine cases in which object detection may be used to more accurately detect a target object or to perform object detection in cases where motion-based tracking is inadequate based on a comparison to a tracking threshold value.

In some configurations, rather than skipping object detection on a current video frame, the results of the motion-based tracking and/or additional information provided by the memory buffer 110 may be used to narrow or tailor the process of performing object detection. For example, where a target object cannot be accurately tracked using a motion-based tracking method, the electronic device 102 may still estimate or obtain information about the location, window scale or other tracked parameter associated with a target object that may be used during object detection to more accurately detect an object using less computational power than without the parameters provided via motion-based tracking. Therefore, even in cases where the motion-based tracking does not provide a tracking confidence value exceeding a tracking threshold, the results of the motion-based tracking may be used when subsequently performing object detection.

Figure 2A:
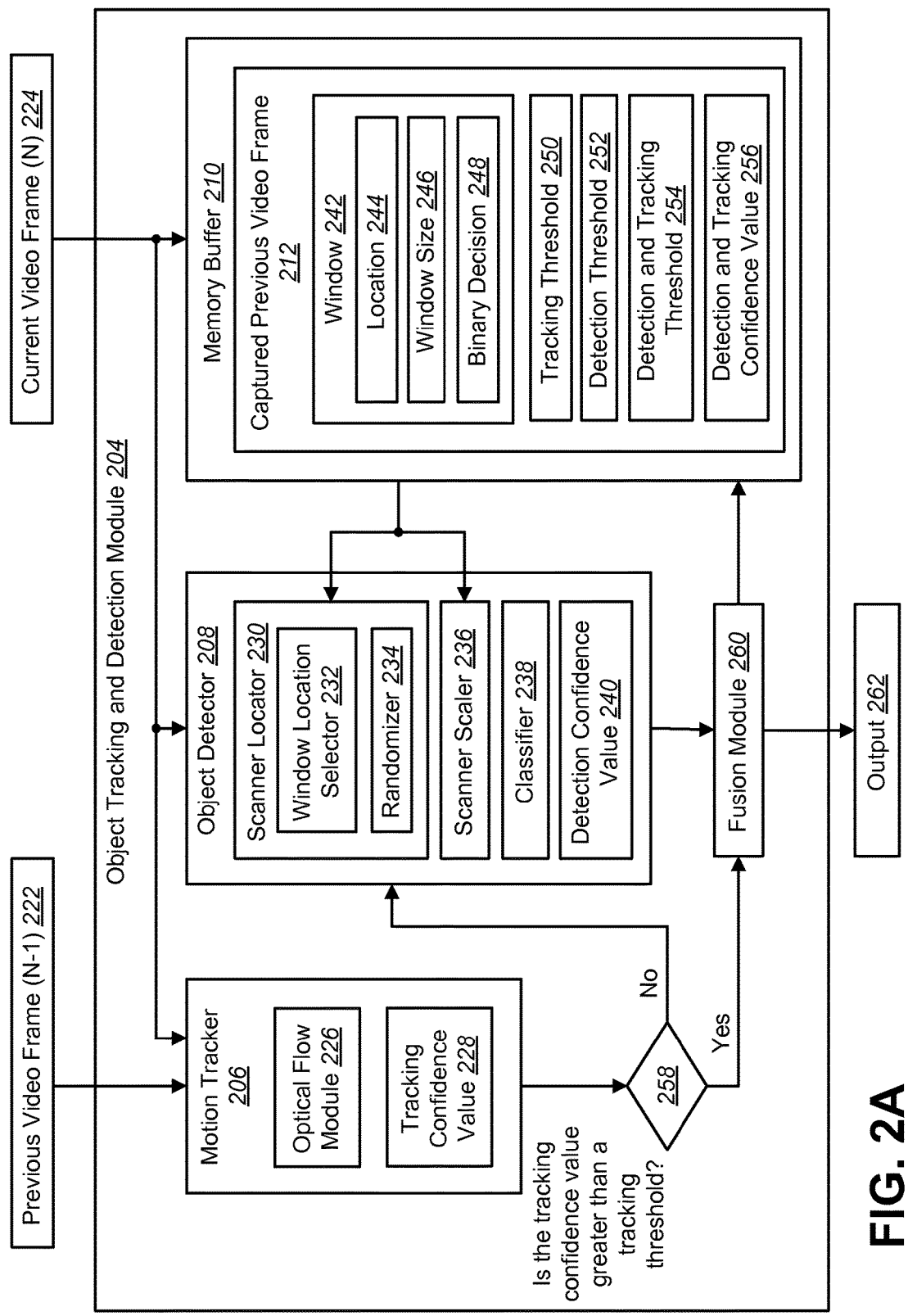
FIG. 2A is a block diagram illustrating an object tracking and detection module.

FIG. 2A is a block diagram illustrating an object tracking and detection module 204. The object tracking and detection module 204 may be implemented within an electronic or wireless device. The object tracking and detection module 204 may include a motion tracker 206 having an optical flow module 226 and a tracking confidence value 228. The object tracking and detection module 204 may also include an object detector 208 having a scanner locator 230, scanner scaler 236, classifier 238 and a detection confidence value 240. The memory buffer 210 may store data associated with a captured previous video frame 212 that may be provided to the motion tracker 206 and object detector 208. The object tracking and detection module 204, motion tracker 206, object detector 208 and memory buffer 210 may be configurations of the object tracking and detection module 104, motion tracker 106, object detector 108 and memory buffer 110 described above in connection with FIG. 1.

The motion tracker 206 may be used to perform motion-based tracking on a current video frame (N) 224. For example, a previous video frame (N−1) 222 and a current video frame (N) 224 may be received (e.g., by the electronic device). The previous video frame (N−1) 222 may immediately precede a current video frame (N) 224 in a sequence of video frames. Additional video frames may be obtained and processed by the object tracking and detection module 204. The previous video frame (N−1) 222 may be provided to a motion tracker 206. Further, the memory buffer 210 may store data associated with the previous video frame (N−1) 222, referred to herein as a captured previous video frame 212. In some configurations, the memory buffer 210 may obtain information about the previous video frame (N−1) 222 directly from the electronic device (e.g., from the camera). The memory buffer 210 may also obtain tracking results about the previous video frame (N−1) 222 from the fusion module 260 which may specify where an object was tracked and/or detected in the previous video frame (N−1) 222. This information about the previous video frame (N−1) 222 or other previously captured video frames may be stored in the memory buffer 210.

The motion tracker 206 may subsequently receive a current video frame (N) 224 in a sequence of video frames. The motion tracker 206 may compare the current video frame (N) 224 to the previous video frame (N−1) 222 (e.g., using information provided from the memory buffer 210). The motion tracker 206 may track motion of an object on the current video frame (N) 224 using an optical flow module 226. The optical flow module 226 may include hardware and/or software for performing motion-based tracking of an object on a current video frame (N) 224. By comparing the previous video frame (N−1) 222 and the current video frame (N) 224, the motion tracker 206 may determine a tracking confidence value 228 associated with the likelihood that a target object is in the current video frame (N) 224. In one example, the tracking confidence value is a real number (e.g., between 0 and 1) based on a percentage of certainty that the target object is within the current video frame (N) 224 or a window within the current video frame (N) 224.

The object detector 208 may be used to detect an object on a current video frame (N) 224. For example, the object detector 208 may receive a current video frame (N) 224 in a sequence of video frames. The object detector 208 may perform object detection on the current video frame (N) 224 based on a tracked parameter. The tracked parameter may include a tracking confidence value 228 corresponding to a likelihood that a target object is being accurately tracked. More specifically, a tracked parameter may include a comparison of the tracking confidence value 228 to a tracking threshold 250. The tracked parameter may also include information provided from the memory buffer 210. Some examples of tracked parameters that may be used when detecting an object include a region, a window location, a window size, or other information that may be used by the object detector 208 as a parameter when performing object detection.

The object detector 208 may include a scanner locator 230. The scanner locator 230 may include a window location selector 232 and a randomizer 234. The window location selector 232 may select multiple windows within a video frame. For example, a video frame may include multiple windows, each with an associated location and size. In one configuration, each video frame is divided into multiple (e.g., approximately 10,000) overlapping windows, each including a fraction of the total pixels in the video frame. Alternatively, there may be any suitable number of windows and they may not overlap. The window location selector 232 within the scanner locator 230 may select the location of a window in which to attempt to identify a target object. The randomizer 234 may randomly select windows of varying sizes and locations for detecting an object. In some configurations, the randomizer 234 randomly selects windows within a video frame. Alternatively, the randomizer 234 may more precisely select windows based on one or more factors. For example, the randomizer 234 may limit the selection of windows based on a region, size or general location of where an object is most likely located. This information may be obtained via the memory buffer 210 or may be obtained via the motion-based tracking that, while not accurate enough to be relied on entirely, may provide information that is helpful when performing object detection. Therefore, while the randomizer 234 may randomly select multiple windows to search, the selection of windows may be narrowed, and therefore not completely random, based on information provided to the object detector 208.

The object detector 208 may also include a scanner scaler 236, which may be used to draw or select a window of a certain size. The window size may be used by the scanner locator 230 to narrow the sizes of windows when detecting an object or comparing a selection of windows to an original image to detect whether an image is within a specific window. The scanner scaler 236 may select one or more windows of certain sizes or scale levels initially when defining an object or, alternatively, draw one or more windows of certain sizes or scale levels based on information provided from the memory buffer 210.

The classifier 238 may be used to determine whether some or all of a target object is found in a specific window. In some configurations, the classifier 238 may produce a binary value for each window to indicate whether a target object is detected within a specific window or subwindow. This classification (e.g., binary classification) may be performed for each window searched by the object detector 208. Specifically, the classifier 238 may generate a binary 1 for each window in which the object is detected and a binary 0 for each window in which the object is not detected. Based on the number or a combination of 1s and 0s, the object detector 208 may determine a detection confidence value 240 indicating a likelihood that the target object is present within a current video frame (N) 224. In some configurations, the detection confidence value 240 is a real number between 0 and 1 indicating a percentage or probability that an object has been accurately detected.

The object detector 208 may perform object detection according to a variety of tracked parameters, including a region, target size, window size, scale level, window location and one or more confidence values. Once the windows of a video frame or a subset of windows are searched and the object detector 208 obtains a binary value for each searched window, the object detector 208 may determine window size as well as a location or region on the current video frame that has the highest confidence. This location and window size may be used in subsequent tracking and detecting to more accurately track and/or detect a target object.

As stated above, various methods may be used by the object detector 208 in detecting a target object. In one configuration, detecting a target object may include performing a binary classification for windows at every possible window location and every possible window size. However, searching every possible window is resource intensive. Thus, in another configuration, the object detector may search a subset of window locations and sizes, rather than all possible windows in a video frame. For example, the object detector 208 may search 1% of all possible windows. Then, if detection is unsuccessful (e.g., the detection confidence value 240 is less than a detection threshold 252), a higher percentage of window locations may be searched in a subsequent captured frame, e.g., 2%. The step in percentage of window locations searched may be uniform, non-uniform, slow or fast, i.e., consecutive frames may have 1%, 2%, 3%, 4% or 1%, 2%, 4%, 8%. In one configuration, the percentage of searched frames may be set very high (e.g., 80%, 90%, 100%) in response to a high detection confidence value, i.e., to ensure that the target object is a next video frame. For example, the percentage of searched frames may jump to at least 80% in response to a detection and tracking confidence value that exceeds a detection and tracking threshold value. Alternatively, the percentage may jump to 60%, 70%, 90%, etc. Additionally, any suitable value for the detection and tracking threshold value may be used, e.g., 0.6, 0.65, 0.7, 0.75, 0.8, 0.85, etc. Furthermore, the percentage of windows searched may be determined randomly, based on a randomizer (random number generator), e.g., a random percentage of windows between 1% and 15% may be searched in a captured frame. By searching a subset of all the window locations, the object detection may use fewer resources in the electronic device.

Furthermore, the present systems and methods may search a subset of window sizes for each location. Each window size may be referred to herein as a scale level, each scale level corresponding to a specific window size. For example, there may be 20 possible scale levels. Rather than searching all 20 scale levels, a subset of scale levels or window sizes may be searched at each window location.

The present systems and methods may also use feedback from the memory buffer 210 to tailor the window locations and sizes searched. In other words, the location and size of the last captured video frame in which the target object was successfully detected and/or tracked may be used as a starting point for searching a current video frame (N) 224. For example, if the target object was detected and tracked in a recent video frame (i.e., the detection and tracking confidence value 256 for a recent captured video frame is above a detection and tracking threshold), the scanner locator may start searching a current captured frame at the location and size associated with the recent frame. For example, where a target object moves out of the field of view of an optical system or disappears at a distance, the target object may be more likely to reappear at the same size as when the target object left the field of view of the optical system or disappeared at a distance. Thus, a size or range of sizes may be predicted for detecting the target object in subsequent video frames when performing object detection.

Furthermore, the search range of window locations and window sizes searched in the captured video frame (N) 224 may be limited to those similar to the window location and window size associated with the target object in a recent video frame (e.g., the previous video frame (N−1) 222). As used herein, the term "search range" refers to the set of candidate window locations or candidate window sizes (or both) that may be utilized when detecting and/or tracking a target object in a video frame. For example, the subset of the window locations searched may be selected from within a portion of the current video frame (N) 224 based on where the target object was found in a recent video frame, e.g., one of the quadrants or halves of the current video frame (N) 224. In other words, the search space may be limited to nearby where the target object was last tracked or detected. Similarly, the sizes of frames searched for each window location may be limited based on the size of the window in which the targeted object was found in a recent video frame. For example, if the object was detected in a recent frame using a window with a scale level of 8, the scanner scaler 236 may select only window scale levels for the current video frame (N) 224 of 8, plus or minus 3, i.e., scale levels 5-11. This may further eliminate low probability searching and increase the efficiency of object detection. Alternatively, if a recent (non-current) video frame did not detect the target object (i.e., the detection and tracking confidence value 256 for the recent video frame is below a detection and tracking threshold), the object detector 208 may expand the search space (window locations) that is searched, e.g., a wider range of an image or the whole image may be subject to search.

The object tracking and detection module 204 may include a fusion module 260 to merge multiple windows to form a single window. There are initially two confidence values: a detection confidence value 240 from the object detector 208 and a tracking confidence value 225 from the motion tracker 206. The fusion module 260 may combine the two confidence values (e.g., pick the one that is larger) into a detection and tracking confidence value 256. The detection and tracking confidence value 256 may indicate whether the target object was identified on a video frame. In one configuration, the detection and tracking confidence value 256 may be a real number between 0 and 1, where 0 indicates the lowest possible confidence that the target object was identified in a particular video frame and 1 indicates the highest possible confidence that the target object was identified in a particular video frame. In other words, the detection and tracking confidence value 256 may serve as an overall indication of the likelihood that a target object was found. Further, the detection and tracking confidence value 256 may be a parameter used for determining a window location, window size or percentage of windows to search in a next video frame. The fusion module 260 may be used to provide information about a current video frame (N) 224 to the memory buffer 210. In one example, the fusion module 260 may provide information about the tracked window 242 (e.g., window location 244, window size 246, etc.) and a detection and tracking confidence value 256 to the memory buffer 210. The fusion module 260 may use the tracking results (e.g., bounding boxes) from the motion tracker 206 and object detector 208 to form a combined tracking result (e.g., bounding box) and calculate the detection and tracking confidence value 256.

The memory buffer 210 may store one or more values associated with the previous video frame (N−1) 222, the current video frame (N) 224 or other captured video frames. In one configuration, the memory buffer 210 stores a captured previous video frame 212, which may include information corresponding to the previous video frame (N−1) 222. The captured previous video frame 212 may include information about one or more windows 242, including the location 244, window size 246 and a binary decision 248 (e.g., from the classifier 238) for each window 242. The captured previous video frame 212 may also include a tracking threshold 250, detection threshold 252 and a detection and tracking threshold 254. The tracking threshold 250 may be provided to the motion tracker 206 or circuitry on the object tracking and detection module (e.g., confidence level comparator) to determine 258 whether the tracking confidence level is greater than the tracking threshold 250. The detection threshold 252 may be provided to the object detector 208 or other circuitry on the object tracking and detection module 204 to determine whether the detection confidence value 240 is greater than the detection threshold 252. The detection and tracking threshold 254 may be a combined value based on the tracking threshold 250 and the detection threshold 252. The detection and tracking threshold 254 may be compared to a detection and tracking confidence value 256 to determine a combined confidence value for the motion-based tracking and the object detection. Each of the thresholds may be based on a likelihood that a target object is located within a video frame. The object tracking and detection module 204 may perform motion-based tracking and/or detection on a current video frame (N) 224 until a specific detection and tracking confidence value 256 is obtained. Further, the motion-based tracking and object detection may be performed on each video frame in a sequence of multiple video frames.

Performing motion-based tracking and object detection may include sequentially performing motion-based tracking followed by object detection based on a tracked parameter. In particular, the present systems and methods may implement a two-step tracking and detection approach. Since motion-based tracking is based on relative motion of a scene, rather than actual object identification as used object detection, the motion-based tracking may be less resource-intensive in an electronic device than performing object detection. Accordingly, it may be more efficient to use the motion tracker 206 instead of the object detector 208, where a target object may be accurately tracked without also performing object detection.

Therefore, rather than using the motion tracker 206 in parallel with the object detector 208, the object tracking and detection module 204 only uses the object detector 208 where the motion tracker 206 is insufficient, i.e., the motion tracking and object detection (if performed at all) are performed sequentially instead of in parallel. For each video frame on which tracking is performed, the motion tracker 206 may produce a tracking confidence value 228, which may be a real number between 0 and 1 indicating a likelihood that the target object is in a current video frame (N) 224.

In one configuration of the two-step tracking and detection approach, the motion tracker 206 may first perform motion-based tracking on a current video frame (N) 224. The motion tracker 206 may determine a tracking confidence value 228 based on the motion-based tracking process. Using the tracking confidence value 228 and a tracking threshold 250 provided by the memory buffer 210, circuitry within the object tracking and detection module 204 (e.g., a confidence level comparator) may determine 258 whether the tracking confidence value 228 exceeds a tracking threshold 250. If the tracking confidence value 228 is greater than the tracking threshold 250, the object tracking and detection module 204 may skip performing object detection and provide the tracking result to a fusion module 260 to produce an output 262. The output 262 may include an indication that a target object is within a current video frame (N) 224. Further, the output 262 may include additional information about the target object.

If the tracking confidence value 228 does not exceed the tracking threshold 250, the object detector 208 may subsequently perform object detection on the current video frame (N) 224. The object detection may be performed on all or a subset of windows within the current video frame (N) 224. The object detector 208 may also select a subset of windows, window sizes or other detection criteria based on results of the motion-based tracking and/or information provided from the memory buffer 210. The object detection may be performed using a more or less robust process based on one or more tracked parameters provided to the object detector 208. The object detector 208 may determine a detection confidence value 240 and compare the detection confidence value 240 to a detection threshold 252. If the detection confidence value 240 is above a detection threshold 252, the object detector 208 may provide the detection result to the fusion module 260 to produce an output 262. The output may include an indication that a target object is within a current video frame (N) 224 and/or include additional information about the detected object.

Alternatively, if the detection confidence value 240 is less than or equal to a detection threshold 252, the object detector 208 may perform object detection again using a more robust method, such as searching a greater number of windows within the current video frame (N) 224. The object detector 208 may repeat the process of object detection until a satisfactory detection confidence value 240 is obtained. Once a satisfactory detection confidence value 240 is obtained such that a target object within the current video frame is identified, the object tracking and detection module 204 may be used to perform tracking and detection on a next video frame.

Figure 2B:
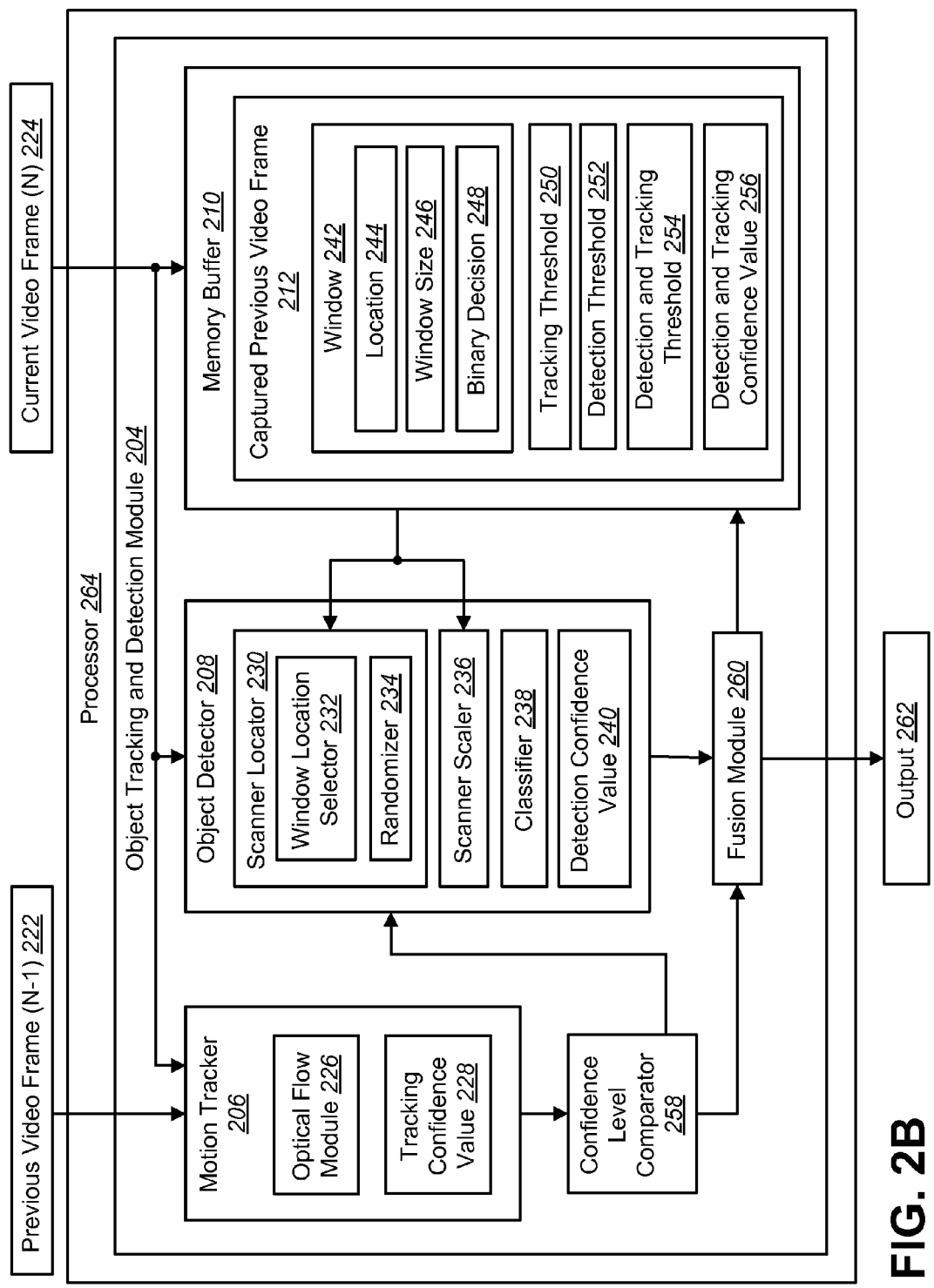
FIG. 2B illustrates some components within the system of FIG. 2A being implemented by a processor.

FIG. 2B illustrates some components within the system of FIG. 2A being implemented by a processor 264. As shown in FIG. 2A, the object tracking and detection module 204 may be implemented by a processor 264. Different processors may be used to implement different components (e.g., one processor may implement the motion tracker 206, another processor may be used to implement the object detector 208 and yet another processor may be used to implement the memory buffer 210).

Figure 3:
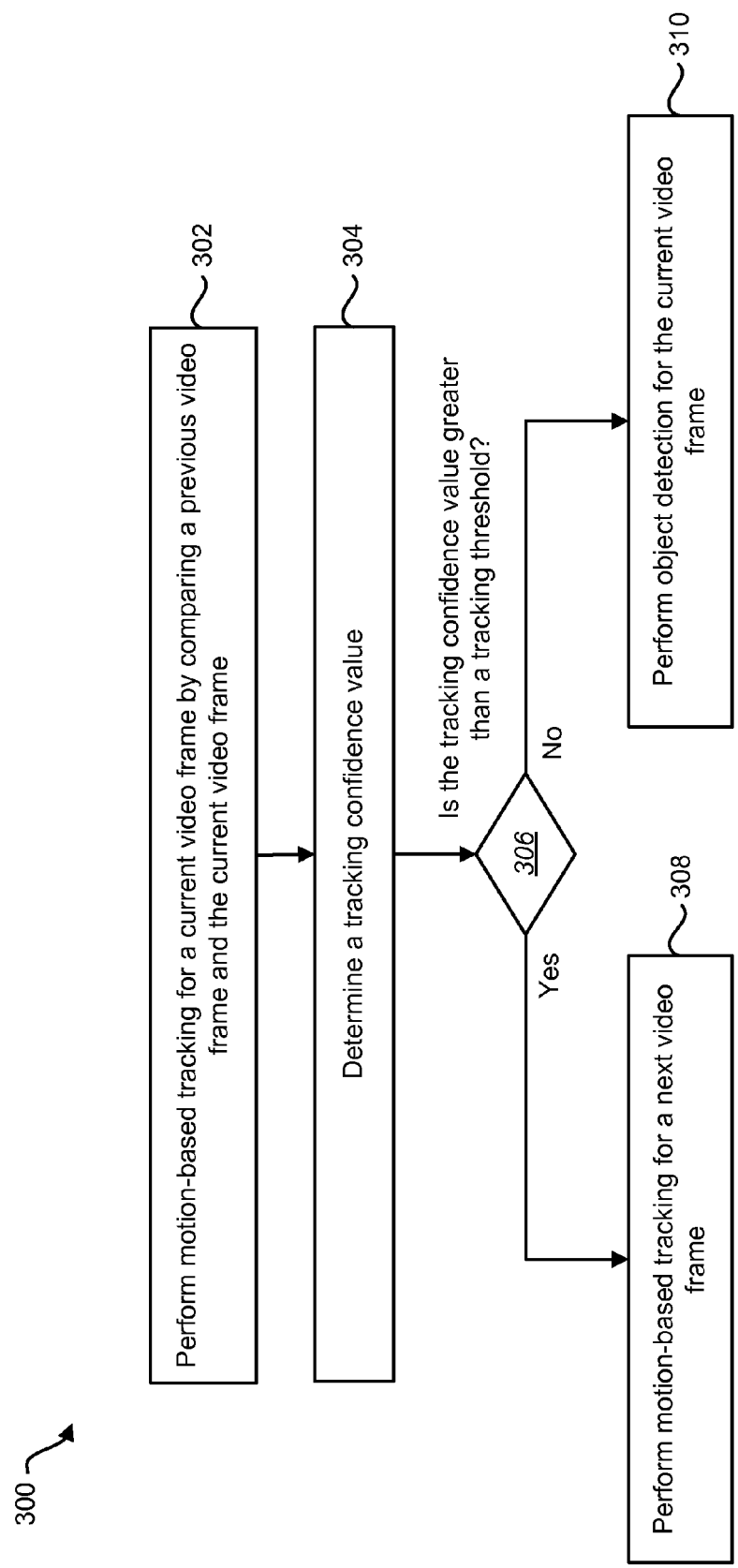
FIG. 3 is a flow diagram illustrating a method for performing motion-based tracking and object detection.

FIG. 3 is a flow diagram illustrating a method 300 for performing motion-based tracking and object detection. The method 300 may be implemented by an electronic device 102, e.g., an object tracking and detection module 104. The electronic device 102 may perform 302 motion-based tracking for a current video frame (N) 224 by comparing a previous video frame (N−1) 222 and the current video frame (N) 224. Tracking an object may be performed using a median flow method by tracking points between pairs of images. Other methods of motion-based tracking may also be used. Additionally, the motion-based tracking may be performed for a current video frame (N) 224 using information about a captured previous video frame 112 provided via a memory buffer 110.

The electronic device 102 may determine 304 a tracking confidence value 228. The tracking confidence value 228 may indicate a likelihood or certainty that a target object has been accurately tracked. The electronic device 102 may determine 306 whether the tracking confidence value 228 is greater than a tracking threshold 250. If the tracking confidence value 228 is greater than the tracking threshold 250, the electronic device 102 may perform 308 motion-based tracking for a next video frame. Further, the electronic device 102 may skip performing object detection on the current video frame based on the result of the motion-based tracking. In other words, object detection may be performed for the current video frame only when the motion tracking is not very good, i.e., if the tracking confidence value is not greater than a tracking threshold. If, however, the tracking confidence value 228 is not greater than the tracking threshold 250, the electronic device 102 may perform 310 object detection for the current video frame (N) 224. The electronic device 102 may perform the object detection in sequence to the motion-based tracking. In some configurations, the object detection may be performed multiple times with varying robustness to obtain a higher detection confidence value 240.

Figure 4:
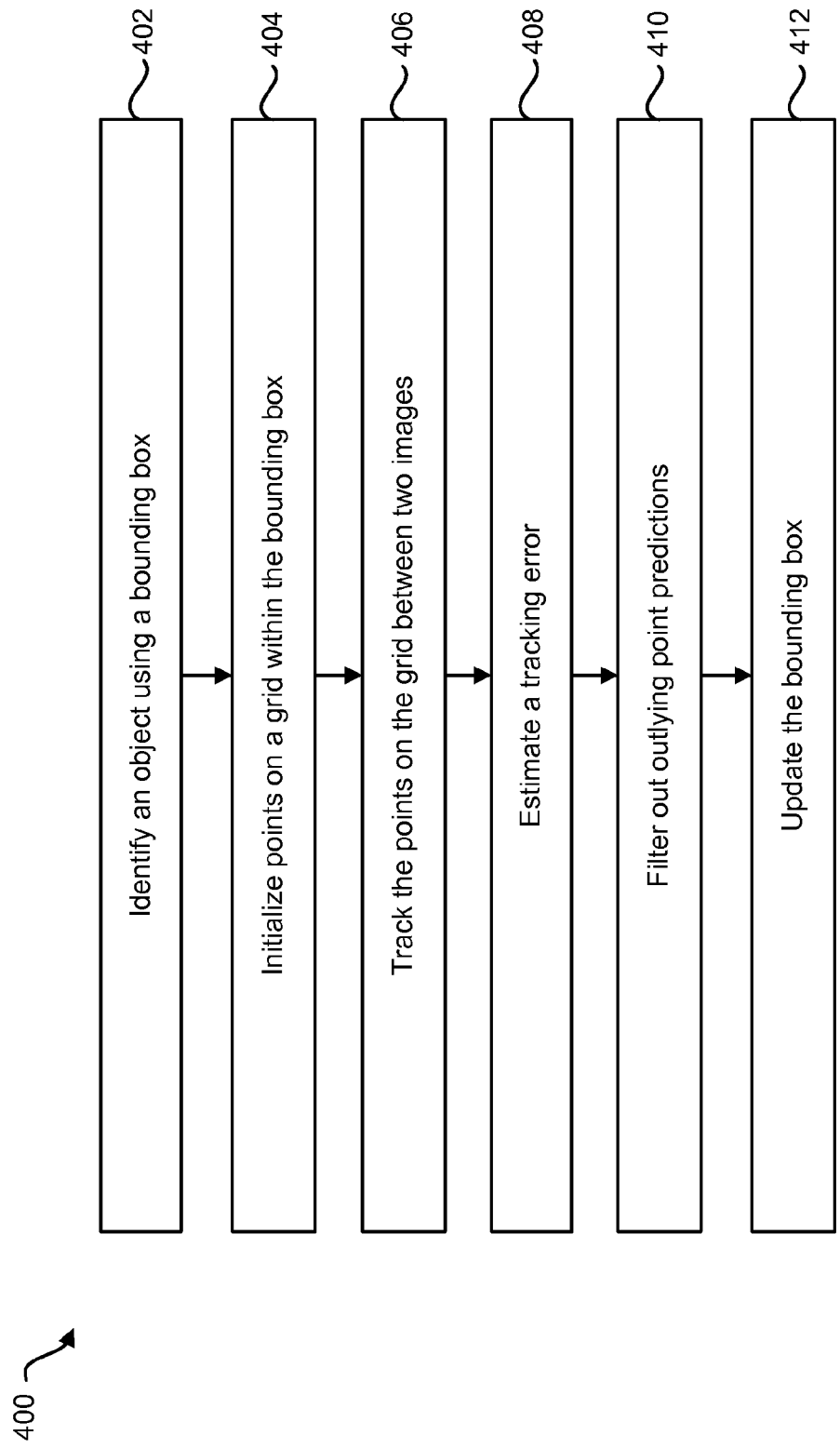
FIG. 4 is a flow diagram illustrating a method for performing motion-based tracking.

FIG. 4 is a flow diagram illustrating a method 400 for performing motion-based tracking. The method 400 may be implemented by an electronic device 102, e.g., an object tracking and detection module 104. The electronic device 102 may identify 402 a target object using a bounding box. Identifying 402 an object may be performed manually using a touchscreen 116 or other input method in which an object of interest is selected. Multiple objects may be identified in a similar way. Further, other input methods may be used to identify an object to be tracked. In one example, an object is identified by manually drawing a bounding box around the target object.

The electronic device 102 may initialize 404 points on a grid within the bounding box. The points on the grid may be uniformly spaced throughout the bounding box. Further, the points may be tracked 406 on the grid between two images (e.g., previous video frame (N−1) 222 and current video frame (N) 224). In one example, the points are tracked by a Lucas-Kanade tracker that generates a sparse motion flow between images. The electronic device 102 may estimate 408 a tracking error between the two images (e.g., a previous video frame (N−1) 222 and a current video frame (N) 224). Estimating 408 a tracking error may include assigning each point of the tracked points an error value. Further, estimating 408 a tracking error may be performed using a variety of methods, including forward-backward error, normalized cross correlation (NCC) and sum-of-square differences, for example. The estimated tracking error may be used to obtain a tracking confidence value 228 and ultimately determining a likelihood that a target object is in a current video frame (N) 224. In one configuration, the tracking confidence value 228 may be obtained by calculating a normalized cross correlation (NCC) between a tracked window in a current video frame (N) 224 and a previous video frame (N−1) 222. The tracking error may also be estimated using additional techniques, including a forward-backward error estimation described in more detail below in connection with FIG. 5. Further, the electronic device 102 may filter 410 out outlying point predictions. For example, the electronic device may filter out 50% of the worst predictions. The remaining predictions may be used to estimate the displacement of the bounding box.

The electronic device 102 may update 412 the bounding box. Updating 412 the bounding box may be performed such that the updated bounding box becomes the new bounding box for the next video frame. The motion-based tracking process may then be repeated for a next video frame or, if a tracking confidence value is less than or equal to a tracking threshold 250, the motion-based tracking process may be discontinued for a next video frame until a target object may be accurately tracked. In some configurations, where the motion-based tracking for a current video frame (N) 224 does not provide a satisfactory result, the electronic device may perform object detection on the current video frame (N) 224 to obtain a higher level of confidence in locating a target object. In some configurations, where motion-based tracking cannot produce satisfactory results (e.g., when a target object moves out of range of a video frame), object detection may be performed on any subsequent video frames until a target object is detected.

Figure 5:
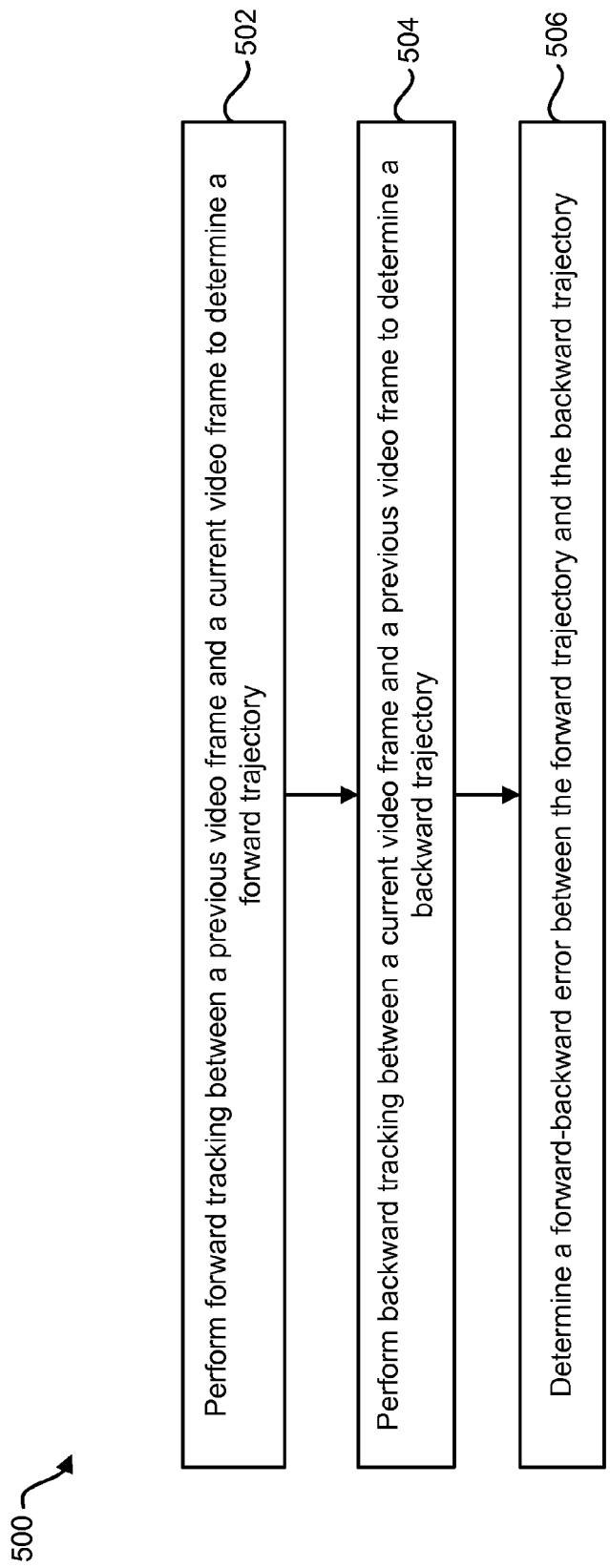
FIG. 5 is a flow diagram illustrating a method of estimating a tracking error in motion-based tracking based on forward-backward error.

FIG. 5 is a flow diagram illustrating a method 500 of estimating a tracking error in motion-based tracking based on forward-backward error. The method 500 may be implemented by an electronic device 102 (e.g., an object tracking and detection module 104). In some configurations, the electronic device 102 may calculate a normalized cross correlation (NCC) between tracked windows. The normalized cross correlation (NCC) may be used to determine a tracking confidence value 228. The electronic device 102 may also use various tracking error estimation techniques complementary to normalized cross correlation (NCC) (e.g., forward-backward error, sum-of-square difference). In an example using forward-backward error estimation, an electronic device 102 may perform 502 forward tracking between a previous video frame (N−1) 222 and a current video frame (N) 224 to determine a forward trajectory. Forward tracking may include tracking an image forward for k steps. The resulting forward trajectory may be equal to ($x_t, x_{t+1}, \ldots, x_{t+k}$), where $x_t$ is a point location in time and k indicates a length of a sequence of images. The electronic device 102 may perform 504 backward tracking between a current video frame (N) 224 and a previous video frame (N−1) 222 to determine a backward trajectory. The resulting backward trajectory may be equal to ($\hat{x}_t, \hat{x}_{t+1}, \ldots, \hat{x}_{t+k}$), where $\hat{x}_{t+k} = x_{t+k}$.

The electronic device 102 may determine 506 a forward-backward error between the forward trajectory and the backward trajectory. The forward-backward error may be defined as the distance between the forward trajectory and the backward trajectory. Further, various distances may be defined for the trajectory comparison. In one configuration, the Euclidean distance between the initial point and the end point of the validation trajectory may be used when determining the forward-backward error. In one configuration, the forward-backward error may be used as the tracking error, which may be used to determine a tracking confidence value 228.

Figure 6:
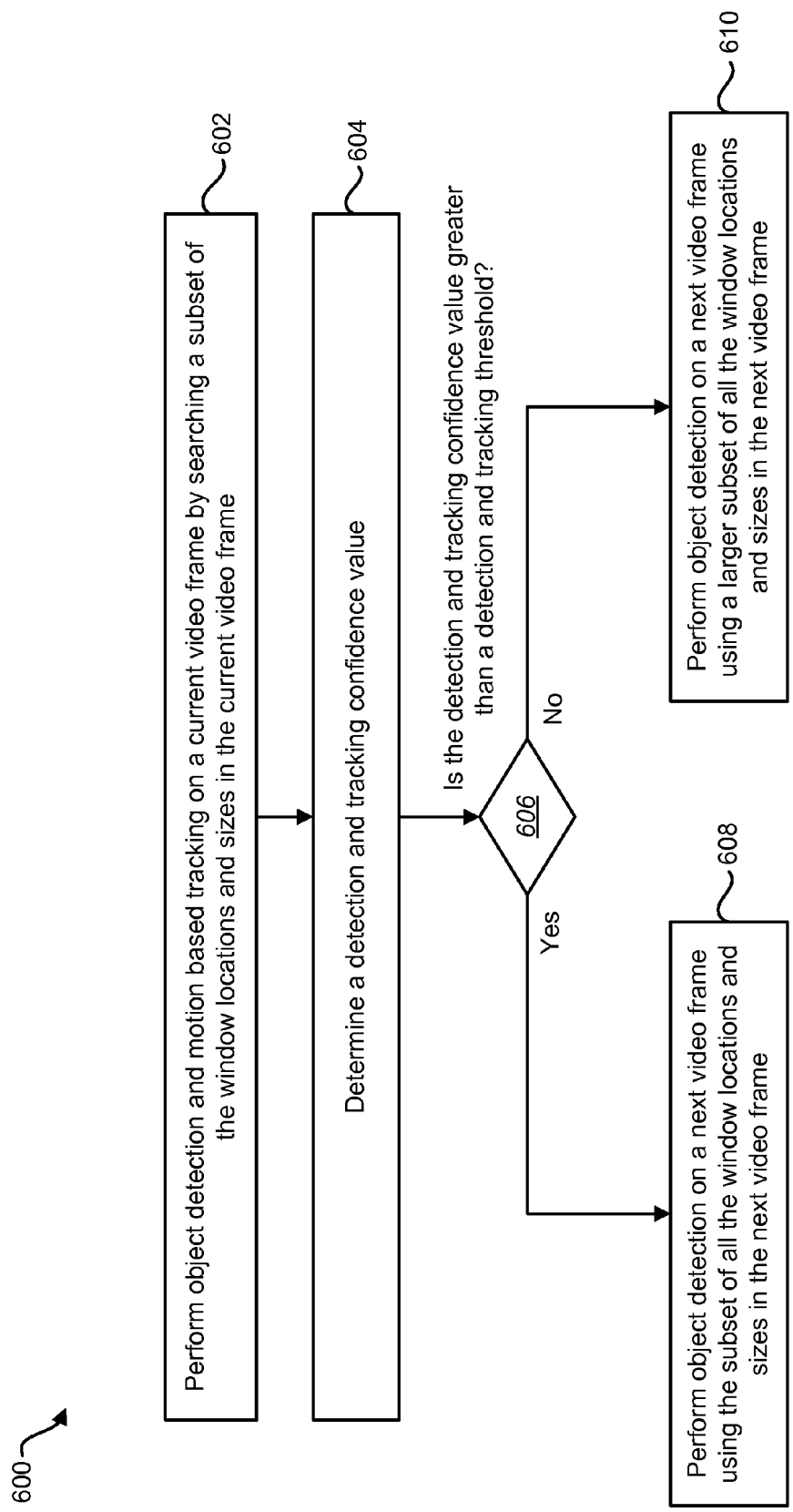
FIG. 6 is a flow diagram illustrating a method for performing object detection.

FIG. 6 is a flow diagram illustrating a method 600 for performing object detection. The method 600 may be implemented by an electronic device 102 (e.g., an object tracking and detection module 104). The electronic device 102 may perform 602 object detection and motion-based tracking on a current video frame (N) 224 by searching a subset of the window locations and sizes in the current video frame (N) 224.

The electronic device 102 may determine 604 a detection and tracking confidence value 256. The detection and tracking confidence value 256 may provide a level of confidence of whether the target object is found in a current video frame (N) 224 or within a particular window. The electronic device 102 may also determine 606 whether the detection and confidence value 256 is greater than a detection and tracking threshold 254. If the detection and confidence value is greater than a detection and tracking threshold 254, the electronic device 102 may perform 608 object detection on a next video frame using the subset (e.g., the same subset) of windows and sizes in the next video frame. Alternatively, if the detection and confidence value 256 is less than a detection and tracking threshold 254, the electronic device 102 may perform 610 object detection on a next video frame using a larger subset of the window locations and sizes in the next video frame. In some configurations, where the confidence value 256 is less than a detection and tracking threshold 254, the electronic device 102 may perform 610 object detection on a next video frame using the entire search space and/or all windows of the next video frame.

Figure 7:
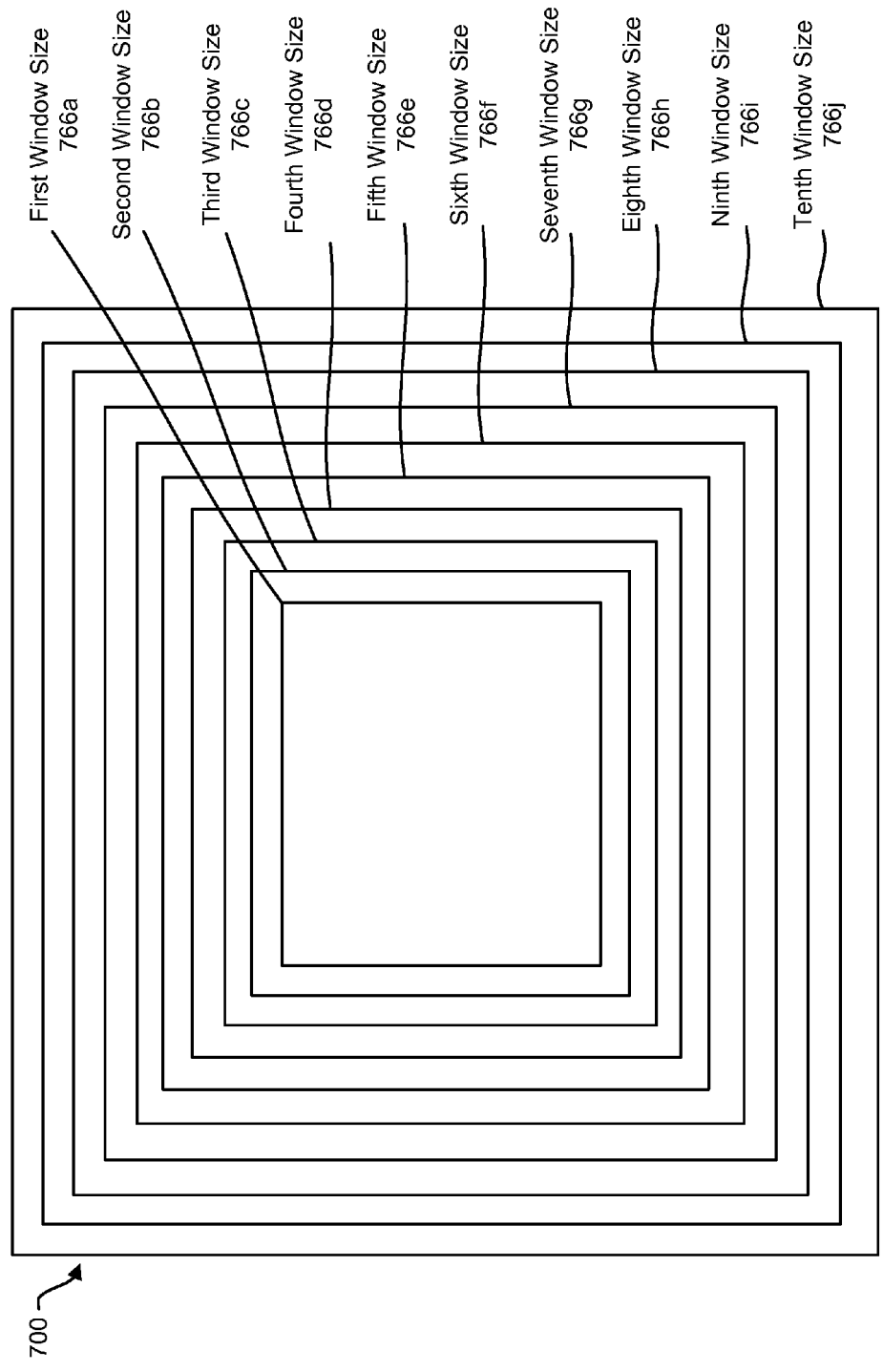
FIG. 7 is a block diagram illustrating different window sizes that may be used with the present systems and methods.

FIG. 7 is a block diagram illustrating an image window 700 having different window sizes 766 that may be used with the present systems and methods. Specifically, FIG. 7 illustrates a set of ten possible window sizes 766a-j. Each window size may correspond to a scale level (e.g., 1-10). Although shown herein as rectangular, the windows that are searched may be any shape, e.g., square, rectangular, circular, elliptical, user-defined, etc. Furthermore, any number of window sizes or scale levels may be available, e.g., 5, 15, 20, 30, etc.

As described above, the search range may be denoted by a subset of window sizes used for a particular location, e.g., the window sizes that are searched in the current video frame (N) 224 may be limited to those similar to the window location and window size associated with the target object in the recent frame. For example, without feedback, the object detector 208 may search all ten window sizes for each selected window location. However, if the object was detected in a recent (non-current) video frame using a window with the fifth window size 766e, the scanner scaler 236 may select only window sizes for the current captured frame of 5, plus or minus 3, i.e., window sizes 2-8. In other words, the windows with the first window size 766a, ninth window size 766i and tenth window size 766j may not be searched based on feedback from a recent or previous video frame (N−1) 222. This may further eliminate low probability searching and increase the efficiency of object detection. In other words, using feedback from a recent video frame may help reduce computations performed. Alternatively, if a recent video frame did not detect the target object (i.e., the detection and tracking confidence value 256 for the recent captured frame is less than a detection and tracking threshold 254), the object detector 208 may not limit the search range by using a subset of size levels.

Figure 8:
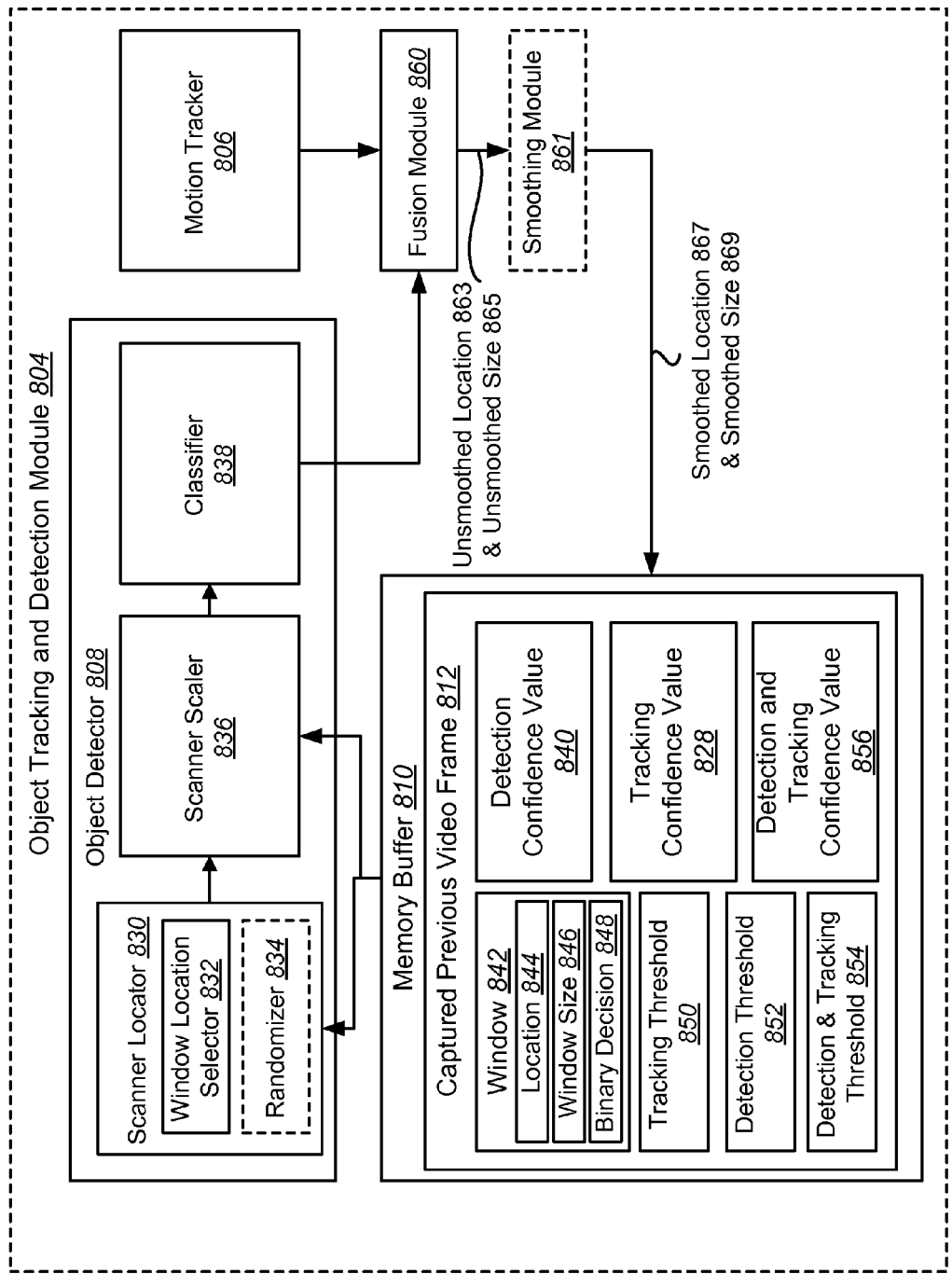
FIG. 8 is a block diagram illustrating another possible configuration of an object tracking and detection module.

FIG. 8 is a block diagram illustrating another possible configuration of an object tracking and detection module 804. The object tracking and detection module 804 illustrated in FIG. 8 may include similar modules and perform similar functionality to the object tracking and detection module 204 illustrated in FIG. 2. Specifically, the object detector 808, motion tracker 806, scanner locator 830, window location selector 832, randomizer 834, scanner scaler 836, classifier 838, fusion module 860, memory buffer 810, captured previous video frame 812, window 842, location 844, size 846, binary decision 848, tracking threshold 850, detection threshold 852, detection and tracking threshold 854, detection confidence value 840, tracking confidence value 828 and detection and tracking confidence value 856 illustrated in FIG. 8 may correspond and have similar functionality to the object detector 208, motion tracker 206, scanner locator 230, window location selector 232, randomizer 234, scanner scaler 236, classifier 238, fusion module 260, memory buffer 210, captured previous video frame 212, window 242, location 244, size 246, binary decision 248, tracking threshold 250, detection threshold 252, detection and tracking threshold 254, detection confidence value 240, tracking confidence value 228 and detection and tracking confidence value 256 illustrated in FIG. 2.

In addition, the object tracking and detection module 804 may include a smoothing module 861 that is used to reduce the jittering affect due to target motion and tracking error. In other words, the smoothing module 861 smooth the tracking results, causing a search window to have a smoother trajectory in both location (x, y) 844 and size (width, height) 846. The smoothing module 861 can be simple moving average (MA) filters or auto regression (AR) filters. The smoothing degree for the location 844 and size 846 can be different. Predictive filters, such as a Kalman filter may also be suitable for location 844 smoothing.

In one configuration, the fusion module 860 may output the combined result of motion tracking and object detection, which may be represented by a bounding box. This bounding box may include both location and size information that is smoothed by the smoothing module 861. Therefore, the smoothing module 861 may receive an unsmoothed location 863 and an unsmoothed size 865 as input and output a smoothed location 867 and a smoothed size 869.

Figure 9:
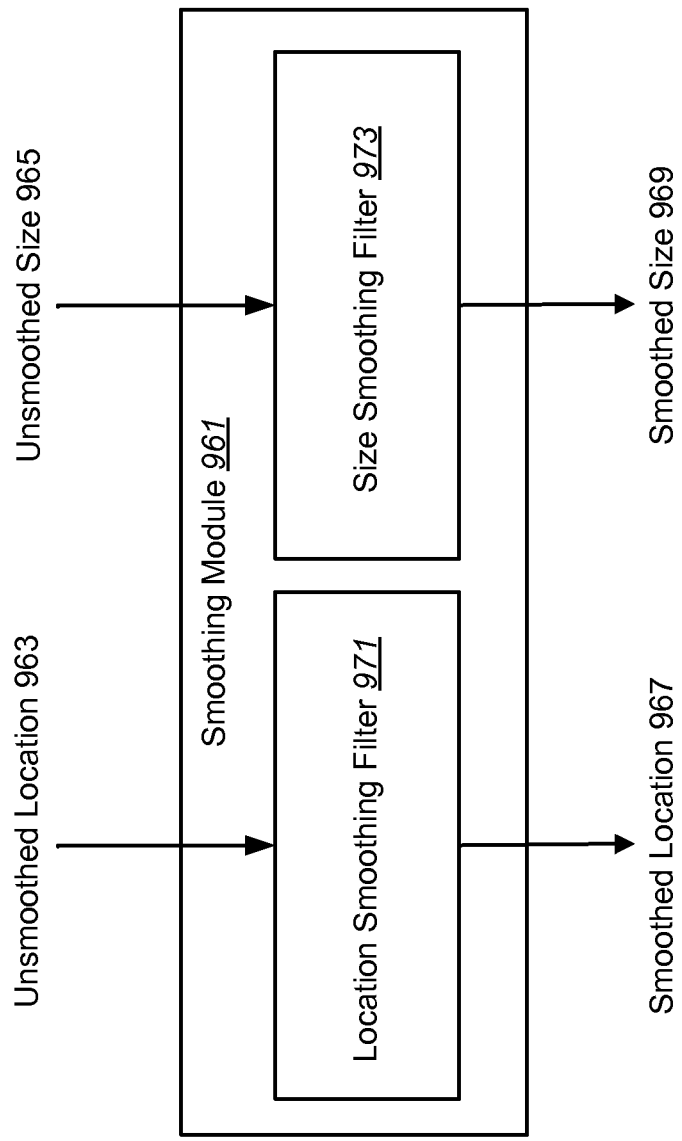
FIG. 9 is a block diagram illustrating a smoothing module.

FIG. 9 is a block diagram illustrating a smoothing module 961. The smoothing module 961 may be used to reduce the jittering affect due to target motion and tracking error, i.e., so the tracking results (bounding box) has a smoother trajectory in both location (x, y) and size (width, height). In one configuration, the location smoothing filter 971 and the size smoothing filter 973 are implemented using an auto regression (AR) model to receive an unsmoothed location 963 and an unsmoothed size 965 as input and output a smoothed location 967 and a smoothed size 969.

In an auto regression (AR) model, assume X is the variable to be smoothed, either the location or the size. Furthermore, let X' be the output of X by the object tracker. In this configuration, the smoothed filtering of X at time t, $X_t$, can be described according to Equation (1):

$$X_t = W*X'_t + (1-W)*X_{t-1} \qquad (1)$$

where $X'_t$ is the tracker output of X at time t, $X_{t-1}$ is the smoothed result of X at time t−1, and W (0<=W<=1) is a smoothing weight that controls the smoothing effect. For example, $X'_t$ may be a window location or window size selected for a current video frame and $X_{t-1}$ may be a window location or window size used for a previous video frame.

A different smoothing weight, W, can be used for the location smoothing filter 971 and the size smoothing filter 973. For example, in one implementation, $W_{location}=0.8$ and $W_{size}=0.4$ so that there is less smoothing effect on the window location but stronger smoothing effect on the window size. This selection of smoothing weights will produce both less tracking delay and less jittering.

Furthermore, the selection of smoothing weight may also be reduced when the detection and tracking confidence value 856 falls below a certain threshold (e.g., the detection and tracking threshold 854). This may cause stronger filtering when potential tracking or detection errors are high. For example, in response to low tracking confidence (e.g., the detection and tracking confidence value 856 is below the detection and tracking threshold 854), the smoothing weights for location and size may be set to $W_{location}=0.65$ and $W_{size}=0.2$, respectively. In other words, one or both of the weights may be decreased, which may cause the window location and size selection to lean more heavily on window locations and sizes of previous video frames than those of a current video frame.

Furthermore, the weighting may be based on a tracking confidence value 828 or a detection confidence value 840 rather than a detection and tracking confidence value 856. For example, the smoothing weights, $W_{location}$ and $W_{size}$, may be decreased in response to a tracking confidence value 828 falling below a tracking threshold 850, i.e., stronger filtering may be used in response to poor motion tracking. Alternatively, the smoothing weights may be decreased in response to a detection confidence value 840 falling below a detection threshold 852, i.e., stronger filtering may be used in response to poor object detection.

In another configuration, Kalman filtering may be used to smooth the window location. In such a configuration, the filtering may be defined according to Equations (2)-(7):

$$x_k = F_k x_{k-1} + w_k \quad (2)$$

$$z_k = H x_{k-1} + v_k \quad (3)$$

where $z_k$ is the observation or measurement of $x_k$, and $x_k$ is the true state defined by $x_k=[x, y, \dot{x}, \dot{y}]$, where (x,y) are the bounding box center location, $(\dot{x}, \dot{y})$ are the velocity in each direction. Additionally, $x_{k-1}$ is the previous state at time k−1. Furthermore, the state transition model, $F_k$, and the observation model, H, may defined by Equations (4)-(5), respectively:

$$F_k = \begin{bmatrix} 1, & 0, & \Delta t, & 0 \\ 0, & 1, & 0, & \Delta t \\ 0, & 0, & 1, & 0 \\ 0, & 0, & 0, & 1 \end{bmatrix} \quad (4)$$

$$H = \begin{bmatrix} 1, 0, 0, 0 \\ 0, 1, 0, 0 \end{bmatrix} \quad (5)$$

where $\Delta t$ is a tunable parameter. Additionally, wk is process noise that is assumed to be drawn from a zero mean multivariate normal distribution with covariance Q (i.e., $w_k \sim N(0,Q)$) according to Equation (6):

$$Q = \begin{bmatrix} 1, & 0, & 0, & 0 \\ 0, & 1, & 0, & 0 \\ 0, & 0, & 1, & 0 \\ 0, & 0, & 0, & 1 \end{bmatrix} * \sigma_1^2 \quad (6)$$

where $\sigma_1$ is a tunable parameter. Similarly, wk is observation noise that is assumed to be zero mean Gaussian white noise with covariance R (i.e., $v_k \sim N(0,R)$) according to Equation (7):

$$R = \begin{bmatrix} 1, & 0, & 0, & 0 \\ 0, & 1, & 0, & 0 \\ 0, & 0, & 1, & 0 \\ 0, & 0, & 0, & 1 \end{bmatrix} * \sigma_2^2 \quad (7)$$

where $\sigma_2$ is a tunable parameter.

Figure 10:
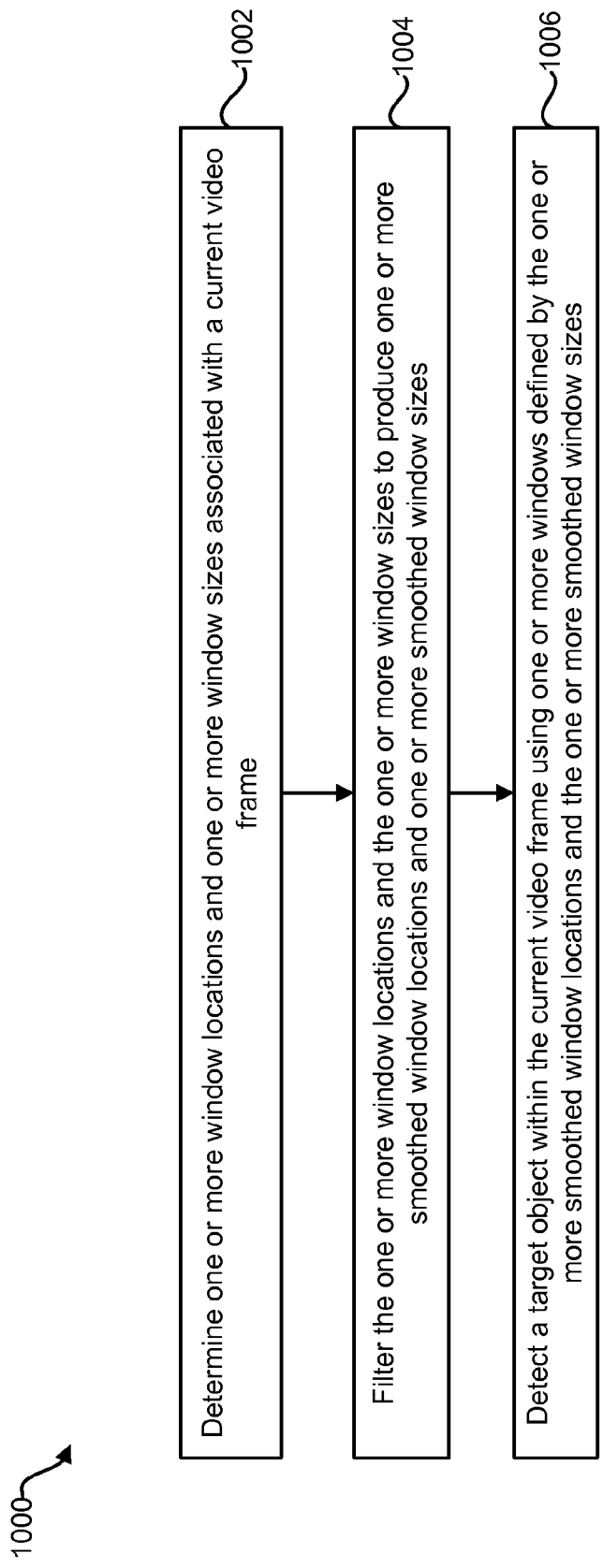
FIG. 10 is a flow diagram illustrating a method for smoothing jitter in motion tracking results.

FIG. 10 is a flow diagram illustrating a method 1000 for smoothing jitter in motion tracking results. The method 1000 may be performed by an electronic device 102, e.g., an object tracking and detection module 804 in an electronic device 102. The electronic device 102 may determine 1002 one or more window locations and one or more window sizes associated with a current video frame, e.g., an unsmoothed location 863 and unsmoothed size 865. The electronic device 102 may also filter 1004 the one or more window locations and the one or more window sizes to produce one or more smoothed window locations 867 and one or more smoothed window sizes 869. For example, this may include using a moving average filter, an auto regression filter or a Kalman filter. In one configuration, in response to low tracking confidence (e.g., the detection and tracking confidence value 856 is below the detection and tracking threshold 854), the smoothing weights for location and size may be reduced. Alternatively, the smoothing weights may be reduced based on the detection confidence value 840 or the tracking confidence value 828. The electronic device may also detect a target object within the current video frame 224 using one or more windows defined by the one or more smoothed window locations 867 and the one or more smoothed sizes 869.

Figure 11:
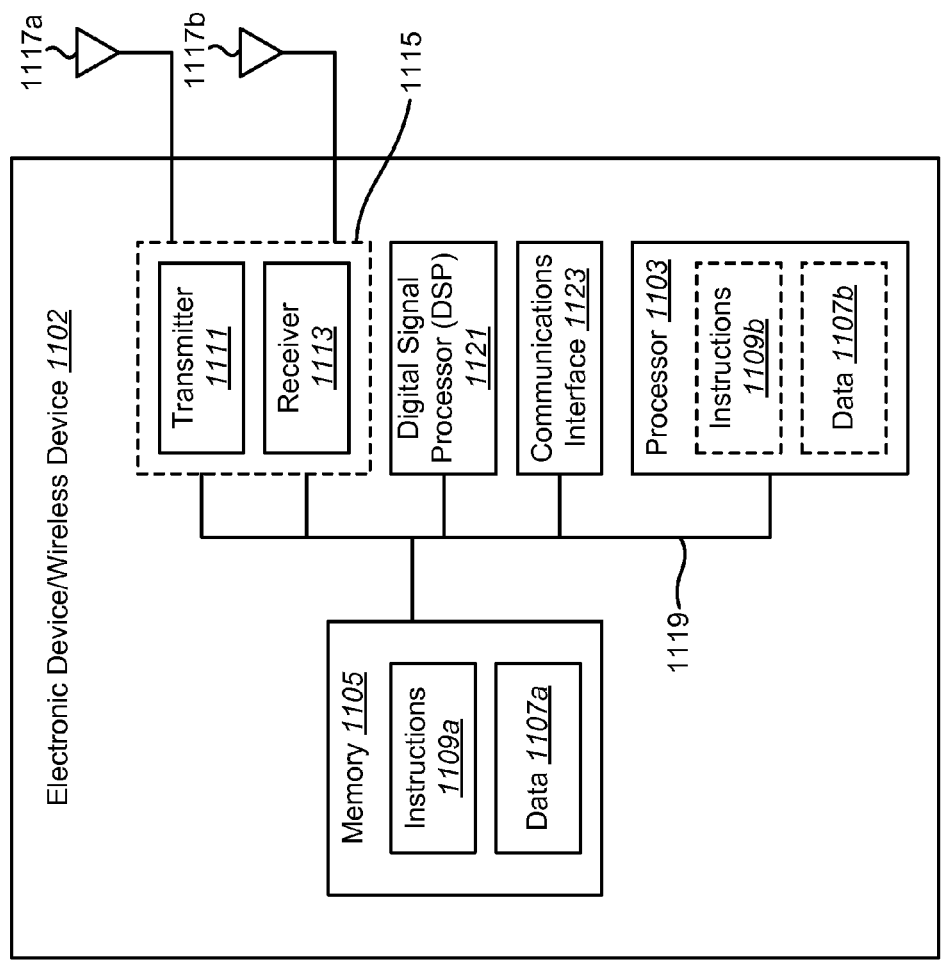
FIG. 11 illustrates certain components that may be included within an electronic device/wireless device.

FIG. 11 illustrates certain components that may be included within an electronic device/wireless device 1102. The electronic device/wireless device 1102 may be an access terminal, a mobile station, a user equipment (UE), a base station, an access point, a broadcast transmitter, a node B, an evolved node B, etc., such as the electronic device 102 illustrated in FIG. 1. The electronic device/wireless device 1102 includes a processor 1103. The processor 1103 may be a general purpose single- or multi-chip microprocessor (e.g., an ARM), a special purpose microprocessor (e.g., a digital signal processor (DSP)), a microcontroller, a programmable gate array, etc. The processor 1103 may be referred to as a central processing unit (CPU). Although just a single processor 1103 is shown in the electronic device/wireless device 1102, in an alternative configuration, a combination of processors (e.g., an ARM and DSP) could be used.

The electronic device/wireless device 1102 also includes memory 1105. The memory 1105 may be any electronic component capable of storing electronic information. The memory 1105 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1107*a* and instructions 1109*a* may be stored in the memory 1105. The instructions 1109*a* may be executable by the processor 1103 to implement the methods disclosed herein. Executing the instructions 1109*a* may involve the use of the data that is stored in the memory 1105. When the processor 1103 executes the instructions 1109, various portions of the instructions 1109*b* may be loaded onto the processor 1103, and various pieces of data 1107*b* may be loaded onto the processor 1103.

The electronic device/wireless device 1102 may also include a transmitter 1111 and a receiver 1113 to allow transmission and reception of signals to and from the electronic device/wireless device 1102. The transmitter 1111 and receiver 1113 may be collectively referred to as a transceiver 1115. Multiple antennas 1117*a-b* may be electrically coupled to the transceiver 1115. The electronic device/wireless device 1102 may also include (not shown) multiple transmitters, multiple receivers, multiple transceivers and/or additional antennas.

The electronic device/wireless device 1102 may include a digital signal processor (DSP) 1121. The electronic device/wireless device 1102 may also include a communications interface 1123. The communications interface 1123 may allow a user to interact with the electronic device/wireless device 1102.

The various components of the electronic device/wireless device 1102 may be coupled together by one or more buses, which may include a power bus, a control signal bus, a status signal bus, a data bus, etc. For the sake of clarity, the various buses are illustrated in FIG. 11 as a bus system 1119.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In accordance with the present disclosure, a circuit, in an electronic device, may be adapted to perform motion-based tracking for a current video frame by comparing a previous video frame and the current video frame. The same circuit, a different circuit, or a second section of the same or different circuit may be adapted to perform object detection in the current video frame based on a tracked parameter. The second section may advantageously be coupled to the first section, or it may be embodied in the same circuit as the first section. In addition, the same circuit, a different circuit, or a third section of the same or different circuit may be adapted to control the configuration of the circuit(s) or section(s) of circuit(s) that provide the functionality described above.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 3-6 and 11, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for detecting and tracking a target object, comprising:
    performing motion-based tracking by comparing a previous video frame and a current video frame;
    determining a tracking error between the previous video frame and the current video frame;
    using the tracking error to obtain a tracking confidence value that corresponds to a likelihood that the target object is in the current video frame;
    selectively performing object detection in the current video frame based on the tracking confidence value, wherein selectively performing object detection comprises performing object detection on the current video frame when the tracking confidence value is less than or equal to a tracking threshold;
    determining a detection confidence value for the current video frame;
    determining a combined detection and tracking confidence value by selecting a larger value from among the tracking confidence value and the detection confidence value; and
    determining whether to narrow or expand a search range to detect the target object in a next video frame based on the combined detection and tracking confidence value.

2. The method of claim 1, wherein determining the tracking error comprises:
    performing forward tracking between the previous video frame and the current video frame to determine a forward trajectory;
    performing backward tracking between the current video frame and the previous video frame to determine a backward trajectory; and
    determining a forward-backward error between the forward trajectory and the backward trajectory.

3. The method of claim 1, wherein selectively performing object detection further comprises skipping object detection on the current video frame when the tracking confidence value is greater than the tracking threshold.

4. The method of claim 1, wherein the object detection is performed sequential to the motion-based tracking.

5. The method of claim 1, wherein the tracking confidence value corresponds to a region.

6. The method of claim 1, wherein the tracking confidence value corresponds to a window location.

7. The method of claim 1, wherein the tracking confidence value corresponds to a window size.

8. The method of claim 1, wherein the tracking confidence value corresponds to a scale level.

9. The method of claim 1, further comprising receiving input at a touchscreen defining the target object.

10. The method of claim 1, wherein performing object detection on the current video frame comprises:
    selecting a first subset of windows, wherein the first subset of windows is included in the previous video frame and also in the current video frame; and
    searching only the first subset of windows in the current video frame for the target object.

11. The method of claim 10, wherein performing object detection further comprises:
    selecting, for each selected window in the first subset of windows, a subset of window sizes; and
    searching only the subset of window sizes for each window in the first subset of windows.

12. The method of claim 10, wherein the selecting comprises selecting the first subset of windows randomly based on a random number generator.

13. The method of claim 10, further comprising selecting a second subset of windows in the current video frame, wherein a size of the second subset of windows is based on whether the target object was detected in the previous video frame.

14. The method of claim 13, wherein an increase in size from the first subset of windows to the second subset of windows is higher if the target object was detected in the previous video frame than if the target object was not detected in the previous video frame.

15. The method of claim 10, further comprising:
    determining whether the combined detection and tracking confidence value for the current video frame is greater than a detection and tracking threshold;
    searching for the target object in the first subset of windows in a subsequent video frame if the combined detection and tracking confidence value for the current video frame is greater than the detection and tracking threshold; and
    searching for the target object in a larger subset of windows in the subsequent video frame if the combined detection and tracking confidence value for the current video frame is less than the detection and tracking threshold.

16. The method of claim 10, further comprising increasing a percentage of windows selected in subsequent frames, wherein an increase in the percentage of windows selected is uniform or non-uniform.

17. The method of claim 16, wherein the percentage of windows selected is at least 60% when the combined detection and tracking confidence value is above a detection and tracking confidence threshold.

18. The method of claim 17, wherein the detection and tracking confidence threshold is one of 0.6, 0.65, 0.7, 0.75, 0.8 and 0.85.

19. The method of claim 1, further comprising narrowing the search range to detect the target object in the next video frame based on the combined detection and tracking confidence value.

20. The method of claim 19, wherein narrowing the search range further comprises selecting window locations for search from a reduced search space when the combined detection and tracking confidence value for the current video frame is greater than a detection and tracking threshold.

21. The method of claim 20, wherein the combined detection and tracking confidence value for the current video frame is a real number between 0 and 1 indicating a likelihood that the target object was detected and tracked in the current video frame.

22. The method of claim 19, wherein narrowing the search range further comprises selecting window locations for search from an entire search space when the combined detection and tracking confidence value for the current video frame is less than or equal to a detection and tracking threshold.

23. An apparatus for detecting and tracking a target object, comprising:
   means for performing motion-based tracking by comparing a previous video frame and a current video frame;
   means for determining a tracking error between the previous video frame and the current video frame;
   means for using the tracking error to obtain a tracking confidence value that corresponds to a likelihood that the target object is in the current video frame;
   means for selectively performing object detection in the current video frame based on the tracking confidence value, wherein the means for selectively performing object detection comprises means for performing object detection on the current video frame when the tracking confidence value is less than or equal to a tracking threshold;
   means for determining a detection confidence value for the current video frame;
   means for determining a combined detection and tracking confidence value by selecting a larger value from among the tracking confidence value and the detection confidence value; and
   means for determining whether to narrow or expand a search range to detect the target object in a next video frame based on the combined detection and tracking confidence value.

24. The apparatus of claim 23, wherein the means for determining the tracking error comprise:
   means for performing forward tracking between the previous video frame and the current video frame to determine a forward trajectory;
   means for performing backward tracking between the current video frame and the previous video frame to determine a backward trajectory; and
   means for determining a forward-backward error between the forward trajectory and the backward trajectory.

25. The apparatus of claim 23, wherein the means for selectively performing object detection further comprises means for skipping object detection on the current video frame when the tracking confidence value is greater than the tracking threshold.

26. The apparatus of claim 23, wherein the object detection is performed sequential to the motion-based tracking.

27. The apparatus of claim 23, wherein the tracking confidence value corresponds to a region.

28. The apparatus of claim 23, wherein the tracking confidence value corresponds to a window location.

29. The apparatus of claim 23, wherein the tracking confidence value corresponds to a window size.

30. The apparatus of claim 23, wherein the tracking confidence value corresponds to a scale level.

31. The apparatus of claim 23, further comprising means for receiving input at a touchscreen defining the target object.

32. The apparatus of claim 23, wherein the means for performing object detection on the current video frame comprises:
   means for selecting a first subset of windows, wherein the first subset of windows is included in the previous video frame and also in the current video frame; and
   means for searching only the first subset of windows in the current video frame for the target object.

33. The apparatus of claim 32, wherein the means for performing object detection further comprises:
   means for selecting, for each selected window in the first subset of windows, a subset of window sizes; and
   means for searching only the subset of window sizes for each window in the first subset of windows.

34. The apparatus of claim 32, wherein the means for selecting comprises means for selecting the first subset of windows randomly based on a random number generator.

35. The apparatus of claim 32, further comprising means for selecting a second subset of windows in the current video frame, wherein a size of the second subset of windows is based on whether the target object was detected in the previous video frame.

36. The apparatus of claim 35, wherein an increase in size from the first subset of windows to the second subset of windows is higher if the target object was detected in the previous video frame than if the target object was not detected in the previous video frame.

37. The apparatus of claim 32, further comprising:
   means for determining whether the combined detection and tracking confidence value for the current video frame is greater than a detection and tracking threshold;
   means for searching for the target object in the first subset of windows in a subsequent video frame if the combined detection and tracking confidence value for the current video frame is greater than the detection and tracking threshold; and
   means searching for the target object in a larger subset of windows in the subsequent video frame if the combined detection and tracking confidence value for the current video frame is less than the detection and tracking threshold.

38. The apparatus of claim 32, further comprising means for increasing a percentage of windows selected in subsequent frames, wherein an increase in the percentage of windows selected is uniform or non-uniform.

39. The apparatus of claim 38, wherein the percentage of windows selected is at least 60% when the combined detection and tracking confidence value is above a detection and tracking confidence threshold.

40. The apparatus of claim 39, wherein the detection and tracking confidence threshold is one of 0.6, 0.65, 0.7, 0.75, 0.8 and 0.85.

41. The apparatus of claim 23, further comprising means for narrowing the search range to detect the target object in the next video frame based on the combined detection and tracking confidence value.

42. The apparatus of claim 41, wherein the means for narrowing the search range further comprises means for selecting window locations for search from a reduced search space when the combined detection and tracking confidence value for the current video frame is greater than a detection and tracking threshold.

43. The apparatus of claim 42, wherein the combined detection and tracking confidence value for the current video frame is a real number between 0 and 1 indicating a likelihood that the target object was detected and tracked in the current video frame.

44. The apparatus of claim 41, wherein the means for narrowing the search range further comprises means for selecting window locations for search from an entire search space when the combined detection and tracking confidence value for the current video frame is less than or equal to a detection and tracking threshold.

45. An electronic device for detecting and tracking a target object, comprising:
a processor;
memory in electronic communication with the processor;
instructions stored in memory, the instructions being executable to:
perform motion-based tracking by comparing a previous video frame and a current video frame;
determine a tracking error between the previous video frame and the current video frame;
use the tracking error to obtain a tracking confidence value that corresponds to a likelihood that the target object is in the current video frame;
selectively perform object detection in the current video frame based on the tracking confidence value, wherein the instructions being executable to selectively perform object detection comprise instructions being executable to perform object detection on the current video frame when the tracking confidence value is less than or equal to a tracking threshold;
determine a detection confidence value for the current video frame;
determine a combined detection and tracking confidence value by selecting a larger value from among the tracking confidence value and the detection confidence value; and
determine whether to narrow or expand a search range to detect the target object in a next video frame based on the combined detection and tracking confidence value.

46. The electronic device of claim 45, wherein the instructions for determining the tracking error comprise:
instructions for performing forward tracking between the previous video frame and the current video frame to determine a forward trajectory;
instructions for performing backward tracking between the current video frame and the previous video frame to determine a backward trajectory; and
instructions for determining a forward-backward error between the forward trajectory and the backward trajectory.

47. The electronic device of claim 45, wherein the instructions being executable to selectively perform object detection further comprise instructions being executable to skip object detection on the current video frame when the tracking confidence value is greater than the tracking threshold.

48. The electronic device of claim 45, wherein the object detection is performed sequential to the motion-based tracking.

49. The electronic device of claim 45, wherein the instructions being executable to perform object detection on the current video frame comprise instructions being executable to:
select a first subset of windows, wherein the first subset of windows is included in the previous video frame and also in the current video frame; and
search only the first subset of windows in the current video frame for the target object.

50. The electronic device of claim 49, wherein the instructions being executable to perform object detection comprise instructions being executable to:
select, for each selected window in the first subset of windows, a subset of window sizes; and
search only the subset of window sizes for each window in the first subset of windows.

51. The electronic device of claim 49, wherein selecting comprises selecting the first subset of windows randomly based on a random number generator.

52. The electronic device of claim 45, further comprising instructions executable to narrow the search range to detect the target object in the next video frame based on the combined detection and tracking confidence value.

53. A computer-program product for detecting and tracking a target object, comprising a non-transitory computer-readable medium having instructions thereon, the instructions comprising:
code for causing an electronic device to perform motion-based tracking by comparing a previous video frame and a current video frame;
code for determining a tracking error between the previous video frame and the current video frame;
code for using the tracking error to obtain a tracking confidence value that corresponds to a likelihood that the target object is in the current video frame;
code for causing the electronic device to selectively perform object detection in the current video frame based on the tracking confidence value, wherein the code for causing the electronic device to selectively perform object detection comprises code for causing the electronic device to perform object detection on the current video frame when the tracking confidence value is less than or equal to a tracking threshold;
code for causing the electronic device to determine a detection confidence value for the current video frame;
code for causing the electronic device to determine a combined detection and tracking confidence value by selecting a larger value from among the tracking confidence value and the detection confidence value; and
code for causing the electronic device to determine whether to narrow or expand a search range to detect the target object in a next video frame based on the combined detection and tracking confidence value.

54. The computer-program product of claim 53, wherein the code for determining the tracking error comprises:
code for performing forward tracking between the previous video frame and the current video frame to determine a forward trajectory;
code for performing backward tracking between the current video frame and the previous video frame to determine a backward trajectory; and code for determining a forward-backward error between the forward trajectory and the backward trajectory.

55. The computer-program product of claim 53, wherein the code for causing the electronic device to selectively perform object detection further comprises code for causing the electronic device to skip object detection on the current video frame when the tracking confidence value is greater than the tracking threshold.

56. The computer-program product of claim 53, wherein the object detection is performed sequential to the motion-based tracking.

57. The computer-program product of claim 53, wherein the code for causing the electronic device to perform object detection on the current video frame comprises:
  code for causing the electronic device to select a first subset of windows, wherein the first subset of windows is included in the previous video frame and also in the current video frame; and
  code for causing the electronic device to search only the first subset of windows in the current video frame for the target object.

58. The computer-program product of claim 57, wherein the code for causing the electronic device to perform object detection comprises:
  code for causing the electronic device to select, for each selected window in the first subset of windows, a subset of window sizes; and
  code for causing the electronic device to search only the subset of window sizes for each window in the first subset of windows.

59. The computer-program product of claim 57, wherein the code for causing the electronic device to select comprises code for causing the electronic device to select the first subset of windows randomly based on a random number generator.

60. The computer-program product of claim 53, the instructions further comprising code for causing the electronic device to narrow the search range to detect the target object in the next video frame based on the combined detection and tracking confidence value.

* * * * *